(12) United States Patent
Neprud

(10) Patent No.: US 8,986,056 B2
(45) Date of Patent: *Mar. 24, 2015

(54) AMPHIBIOUS YACHT

(71) Applicant: Kevin R. Neprud, Wayland, MA (US)

(72) Inventor: Kevin R. Neprud, Wayland, MA (US)

(*) Notice: Subject to any disclaimer, the term of this patent is extended or adjusted under 35 U.S.C. 154(b) by 146 days.

This patent is subject to a terminal disclaimer.

(21) Appl. No.: 13/725,287

(22) Filed: Dec. 21, 2012

(65) Prior Publication Data

US 2014/0004761 A1    Jan. 2, 2014

Related U.S. Application Data

(63) Continuation-in-part of application No. 12/843,734, filed on Jul. 26, 2010, now Pat. No. 8,337,265.

(60) Provisional application No. 61/228,523, filed on Jul. 24, 2009.

(51) Int. Cl.
*B63H 19/08* (2006.01)
*B60F 3/00* (2006.01)

(52) U.S. Cl.
CPC .............. *B60F 3/0069* (2013.01); *B60F 3/0007* (2013.01); *B60F 3/00* (2013.01)
USPC ........................................ 440/12.54; 114/288

(58) Field of Classification Search
USPC ............ 440/12.5, 12.51, 12.52, 12.54, 12.56, 440/12.63, 12.66; 114/288; 180/24.11
See application file for complete search history.

(56) References Cited

U.S. PATENT DOCUMENTS

| | | | |
|---|---|---|---|
| 1,631,248 A | 6/1927 | Cook | |
| 2,048,181 A | 7/1936 | Cook | |
| 3,584,592 A | 6/1971 | Perrine | |
| 3,765,368 A | 10/1973 | Asbeck | |
| 3,941,074 A | 3/1976 | Millerbernd | |
| 4,958,584 A | 9/1990 | Williamson | |
| 6,044,789 A | 4/2000 | Kurzman | |
| 6,546,890 B1 | 4/2003 | Craig | |
| 6,840,825 B1 | 1/2005 | Messano | |
| 7,341,016 B2 | 3/2008 | Terleski et al. | |
| 8,337,265 B2 | 12/2012 | Neprud | |
| 2002/0153745 A1 | 10/2002 | Messano | |
| 2006/0264127 A1 | 11/2006 | Gibbs | |

(Continued)

FOREIGN PATENT DOCUMENTS

WO    2013172845 A1    11/2013

OTHER PUBLICATIONS

International Search Report (mailing date Jul. 30, 2012) issued in related PCT/US12/38418 filed May 17, 2012 (9 pgs).

(Continued)

*Primary Examiner* — Lars A Olson
(74) *Attorney, Agent, or Firm* — Grossman, Tucker, Perreault & Pfleger, PLLC

(57) ABSTRACT

A streamlined amphibious, catamaran yacht is provided that may serve military or civilian purposes as a passenger or cargo carrying truck, limousine, bus, motor home or recreational vehicle on land, and extend those same functions on water, while matching the functionality and performance of similar length boats. The amphibious yacht includes a continuous reveal on the hull bottom from bow to transom that separates two asymmetric catamaran hulls. This reveal, or hull tunnel, may enhance sea stability and maneuverability, and create lift that helps the hull achieve plane and attain higher water speeds.

30 Claims, 17 Drawing Sheets

(56) References Cited

U.S. PATENT DOCUMENTS

| | | |
|---|---|---|
| 2007/0215029 A1 | 9/2007 | Campbell |
| 2008/0176464 A1 | 7/2008 | Longdill et al. |
| 2010/0144220 A1 | 6/2010 | Bailey |
| 2012/0220176 A1 | 8/2012 | Neprud |

OTHER PUBLICATIONS

International Search Report and Written Opinion of the International Searching Authority (mailing date Apr. 30, 2014) issued in related PCT/US2013/076878 (9 pgs).

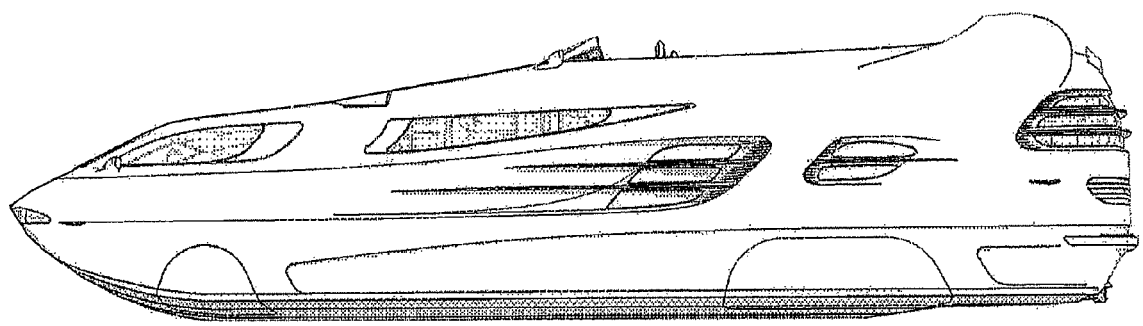
FIG. 31
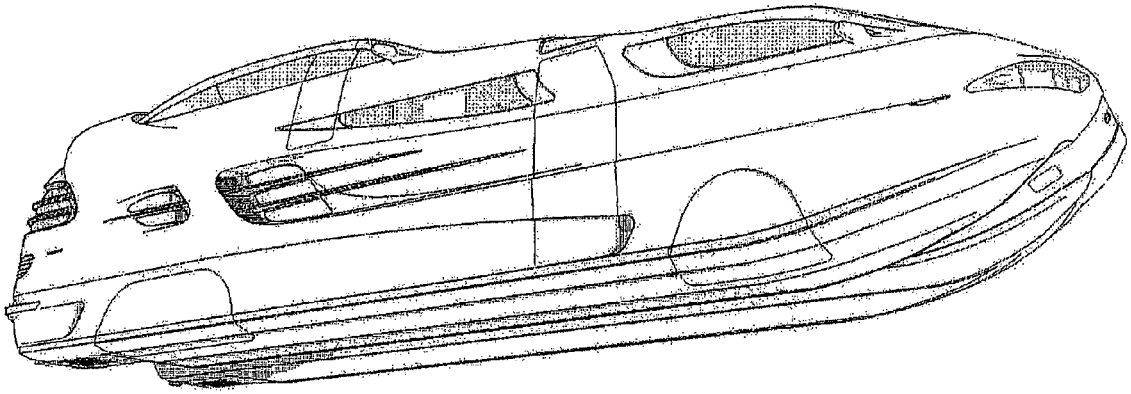
FIG. 32
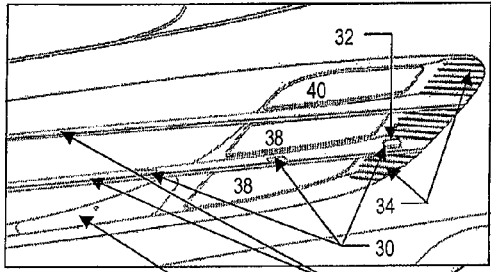
FIG. 33-B
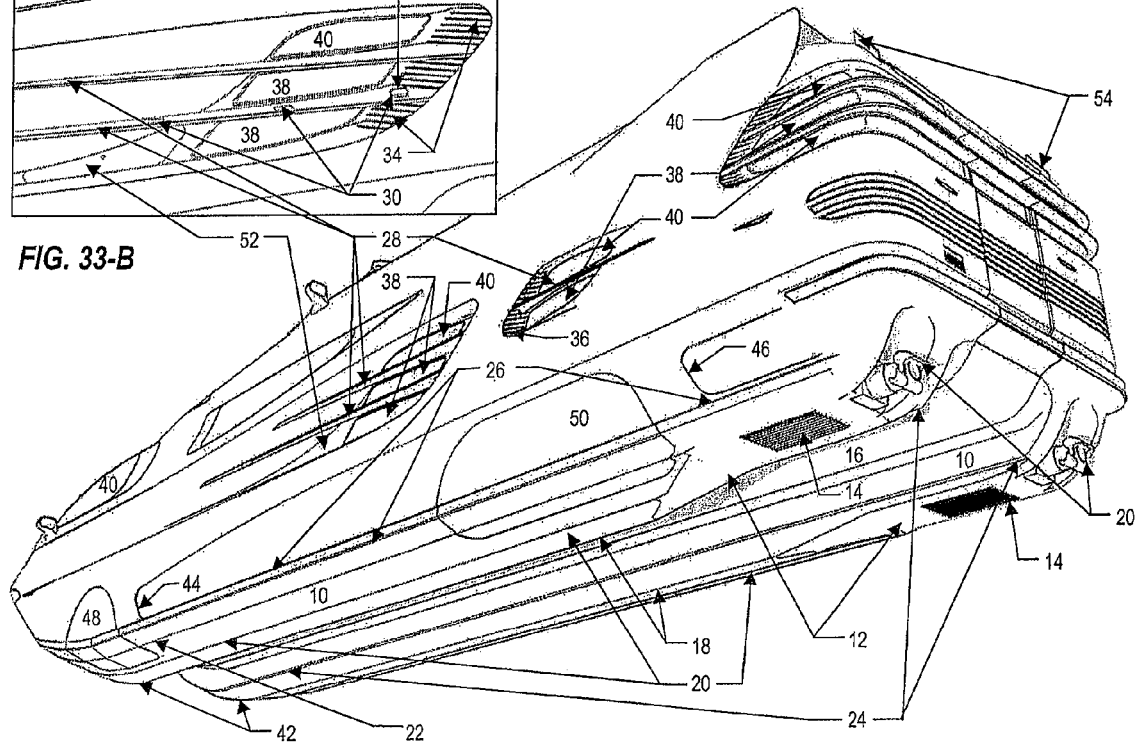
FIG. 33-A

AMPHIBIOUS YACHT

CROSS REFERENCE TO RELATED APPLICATIONS

The present application is a Continuation-In-Part of U.S. patent application Ser. No. 12/843,734, filed Jul. 26, 2010, and claims the benefit of U.S. Provisional Patent Application Ser. No. 61/228,523, filed Jul. 24, 2009, the teachings of which are incorporated herein by reference.

FIELD

The present disclosure relates to the field of amphibious yachts, and more particularly to, a vessel that includes a pair of monohedron hulls and is convertible to a land vehicle yet is capable of planing on the water.

BACKGROUND

Prior art amphibious vehicles are designed as road vehicles that adapt to travel on relatively calm or protected waters. Although they may travel on water, they have many shortcomings when compared to similar sized boats. The present disclosure is directed at a "medium" size amphibious vehicle. "Medium" size herein refers to powered amphibious vehicles between 25 feet in length and the maximum length allowed by roadway standards for non-articulated trucks or buses, (typically 45 feet in length). Prior art vehicles are not designed or equipped for long distance, multi-day water travel, low visibility or rough water conditions nor do they have sufficient provisions to dock or moor. See the "Background of the Invention" section of U.S. Pat. No. 4,958,584 for a more detailed historic overview of prior art amphibious vehicles and their inherent design and performance flaws. An object of the present disclosure is to match or exceed the functionality, performance characteristics and accommodations of both a typical production 45 foot length V-Hull "Express Cruiser Yacht" type power boat and a production "Class A" Luxury Motor Home. It is also an object to improve upon prior art military amphibious vehicles of similar road legal, medium length. "Road legal" as used herein means when the vehicle is driven on US roadways, an escort vehicle is not required.

Smaller prior art amphibious vehicles have been intended mostly as a novelty and have the carrying capacity, shape and proportions of automobiles or small pickup trucks with boat-like bottoms and a low freeboard. Medium size, amphibious vehicles are typically intended for military use, as tour buses for water and land tours, or as a combination RV/house boats. All medium sized prior art wheeled amphibious vehicles (wheeled meaning in land mode they travel on wheels as opposed to tank treads or air cushions like hovercraft) are designed for short distance water travel at speeds of less than 10 miles per hour and do not attempt to match performance or functional characteristics of similar size power boats. The present disclosure describes the first sea-going, wheeled amphibious vessel or vehicle that may attain significantly higher water speeds than any prior art medium size, road legal, amphibious vessel or vehicle.

SUMMARY OF THE DISCLOSURE

The present disclosure is broadly directed at an amphibious yacht having a forward most deck including a leading edge on said forward most deck, said yacht for use in a first configuration on water and in a second configuration on land, the yacht having a bow and stern comprising two asymmetric monohedron hulls separated by a continuous hull tunnel including a tunnel bow curve, said curve starting at the leading edge of the forward most deck which curve increases in radius as it proceeds into the hull tunnel wherein each of said monohedron hulls have a constant deadrise from an apex of the monohedron hull bow curve to the rear wheel wells.

Expanding upon the above, this disclosure is directed at an amphibious catamaran-hulled vessel that may plane on water. To plane, and increase top water speed, the hull and body require certain elements to be integrated into an overall streamlined exterior envelope. Although all items mentioned herein may improve performance, not all of them may be required to achieve plane and attain high water speed.

A streamlined amphibious, power catamaran or tunnel hull boat or yacht may serve military or civilian purposes as a passenger or cargo carrying truck, limousine, bus, motor home or recreational vehicle on land and extend these same functions on water as well, matching the functionality and performance of similar length boats. The yacht may feature a continuous reveal on the hull bottom from bow to transom that separates two asymmetric catamaran hulls. This reveal or hull tunnel may enhance sea stability and maneuverability and create lift, that helps the hull achieve plane and attain higher water speeds.

A mostly enclosed hull and body with tall height gunnels in combination with the catamaran design may significantly improve seaworthiness, allowing long travel distances outside of protected waters and provide greater resistance to catastrophic swamping or capsizing that limits prior art vessels to travel on relatively calm or protected waters.

To further improve stability, maneuverability and load carrying capacity on water, the standard overall beam or vehicle width may be between 11 and 12'-6" wide. "Wide Body" models up to 12'-6" in width are considered legal on United States roadways if drivers have CDL licenses and permits for oversized loads have been obtained. To meet roadway width requirements of 8"-6" maximum, that at present do not require a CDL license or special permits in the US, additional "Narrow Body", 7'-6" to 8-6" width non-amphibious motor homes and amphibious yacht models may also be useful. Two additional embodiments may include one or both of wide and narrow body models. One embodiment may include a full length slide-out that may allow the entire width to expand and retract approximately 3 to 4 feet in overall width. Another embodiment adds retracting, Rigid Hulled Inflatable Hypalon® Sponsons that deploy on both sides of the hull. These embodiments further add additional weight-carrying capacity, stability and maneuverability on water.

All amphibious models of the yacht of the present disclosure may be propelled in the water by two joy stick-controlled water jets. Two driveline embodiments may also be included. One embodiment is a "conventional" diesel engine driven driveline that includes a pair of diesel engines mated to automatic transmissions with each engine transmission combination located deeply in each asymmetric monohedron hull. A driveline located in the port or left hull, may power one or both of the rear wheels that include retractable independent suspension systems located on the port side of the vehicle. A matching driveline and suspension, located similarly within the starboard or right hull, may power the starboard rear wheel or wheels. Via a power take-off and driveshaft, each driveline may also power a water jet propulsion system, located at the stern or rear of each hull. The water jets may be controlled by a single joy stick controller. This embodiment may also include drive shafts, transfer cases and differential gears to drive the wheels from the transmissions. In this embodiment, one driveline can power wheels on one side of the vessel during water to land transitions and the other driveline can power a water jet. This may enable some wheels and a water jet to have full power while transitioning between water and land modes.

A series diesel electric hybrid driveline with electric water jets, in-wheel, electric motors and a fully independent, active suspension system may be the preferred driveline embodiment as it provides more driver control flexibility, a reactive, all-wheel drive, all-wheel steering suspension. It may be more energy efficient and environmentally friendly as well as offer drive by wire capability when roadway infrastructure becomes available to support drive by wire vehicles in the future. The series diesel electric hybrid driveline may require less engine horsepower than non-hybrid drivelines. This may be due in part to a reduction of power losses inherent in non-series hybrid drivelines in amphibious all wheel drive vehicles. The series hybrid driveline may mechanically decouple the engine and generator sets from the rest of the driveline and may not require transmissions, power take-offs, transfer cases, differentials drive shafts and U joints, all of which may introduce power losses and add significant weight. Providing full electrical power for maximum water speed may be accomplished by combining power outputs from the two diesel engine generator sets that only produce 65 to 80 percent of the electrical power requirement for the water jets. The remaining power requirement to maintain maximum water speed for a specified time may be provided by onboard energy storage devices such as lithium ion or lithium titanate battery arrays, ultra capacitors, fuel cells etc. The energy storage devices may power the vessel on land and water with the diesel engines shut off, making the vessel virtually silent running and emission free when traveling in densely populated urban areas or sensitive wildlife habitats.

The series hybrid approach also may allow all wheels and water jets to be powered simultaneously and be piloted by a single operator who can control the speed and direction of both water jets with a single joy stick in one hand and the direction and speed of the wheels with the road mode controls of a forward and reverse toggle switch and steering wheel with the other hand, and one foot to control the gas and brake pedals. Prior art amphibious vehicles do not appear to have this combination of power train components, controls and hull/body elements that may enable pilots with minimal experience to single-handedly operate the vessel proficiently on water, including performing smooth, non-stop transitions between water and land modes.

Prior art amphibious vehicles and non-amphibious vehicles do not appear to offer the potential of 3 or more isolated, full beam or vehicle width private spaces accessed by circulation spaces that are completely separated by walls and doors from the private spaces they serve. A key feature of the amphibious yacht of the present disclosure is a "bridging deck" that directs the circulation space up and over the isolated private spaces. These multiple, full-beam private spaces can be used as sleeping quarters on the main deck level, each of which can include queen size or larger beds and private bathrooms with self-contained showers. The Bridging Deck may create a second level, multi-purpose, flybridge salon above the main deck with the potential of being multi-purpose space that may adapt on the fly to become dining or additional full beam sleeping quarter space. It is contemplated that such a Bridging Deck may be useful in trailers and motor homes less than 8'-6" wide and be further improved with one or more conventional partial vehicle length slide-out housings as shown in FIGS. 23-25. Prior art vehicles or boats do not appear to offer a multi-purpose forward cabin that converts in minutes from an open salon space to a fixed seat dining space for 8 or more adults or to a private sleeping stateroom suite with dedicated private bath and wet bar or to a private two bed crew quarters complete with a fully functioning helm, dedicated bathroom, laundry and direct access to the galley.

This multi-purpose forward cabin may be a common feature of the following distinct adaptations that address 4 popular types of yachts. Although distinguished in purpose and function, for economies of scale and simplifying production, these adaptations share identical hull, body, superstructure, driveline, flybridge and twin main cabin layouts separated by a watertight bulkhead.

One adaptation may be a Roadster Express Cruiser Yacht and provide fixed seating for 22+ passengers and dining accommodations for 20+ passengers. The entire rear cabin space may be dedicated to a master stateroom suite that may include a separate office space, enclosed sleeping cabin, and private bath with a separate shower. In addition to the master suite, a mid-ship VIP stateroom and two flexible spaces adapt on-the-fly to create two more full beam staterooms on the flybridge and forward cabin. The potential of 4 staterooms and 3 full baths may provide comfortable sleeping accommodations for 10+ guests, as shown in FIGS. 17 through 19B. A second adaptation may be a Roadster Excursion Yacht (REY) and may allow more space for entertaining. The rear cabin master suite may be replaced by a salon with double full-height sliding transom doors and continuous, retracting, wrap-around stern windows. In this adaptation, the flybridge layout remains the same as the Express Cruiser. The mid-ship VIP Stateroom and bath may be replaced by additional salon space to effectively double the size of the forward entertaining salon and add a bar that wraps around the galley. Both stairs to the flybridge remain in the same location, but the stair and new salon spaces may be more open to the flybridge to create continuity between both decks. Both adaptations keep the dining areas on the flybridge and the forward multi-purpose salon similar to the Express Cruiser that may also be transformed into sleeping quarters. A third adaptation may be a Roadster Open Sport Yacht. This model is similar to the excursion yacht except that the rear cabin may be an open deck suitable for recreation including fishing, water play or carrying small watercraft or other cargo. A combination of automated retracting windows, soft tops and isinglass windows may allow the rear deck to be enclosed. As shown in FIGS. 28A through 30B, a fourth adaptation may be a Roadster Shadow Yacht—Toy Hauler that may utilize the rear main deck level cabin as a cargo bay 14 with a almost full body width rear door 10 to allow access of cargo such as cars, motorcycles, jet skis, etc. to be ferried over land and water.

Using video, distance detection and auto braking technology, both the forward main cabin salon helm or flybridge helm may be used to pilot the vessel safely on water and land. The flybridge may include a convertible top and retracting windshield that may create an open-air, roadster-like appearance. The following description section includes 14 embodiments having unique, innovative utility and/or design features including a full body length slide-out and that could also be utilized in recreational vehicles such as trailers and motor homes and retracting sponsons that could be used on conventional boats.

BRIEF DESCRIPTION OF THE DRAWINGS

The features, operation and advantages of the disclosure may be better understood from the following detailed description of the preferred embodiments taken in conjunction with the attached drawings, in which

FIGS. 17-19B are Main Deck Plan Views of the Expanded Overall Beam Width of the amphibious yacht of FIG. 1;

FIG. 31 is a Side view of the amphibious yacht of FIG. 1;

FIGS. 32-33A are Hull Underside perspective views of the amphibious yacht of FIG. 1;

FIG. 33B is an enlarged view of the Side Windows and Air Intake Vents of the amphibious yacht of FIG. 1;

Figure 1:
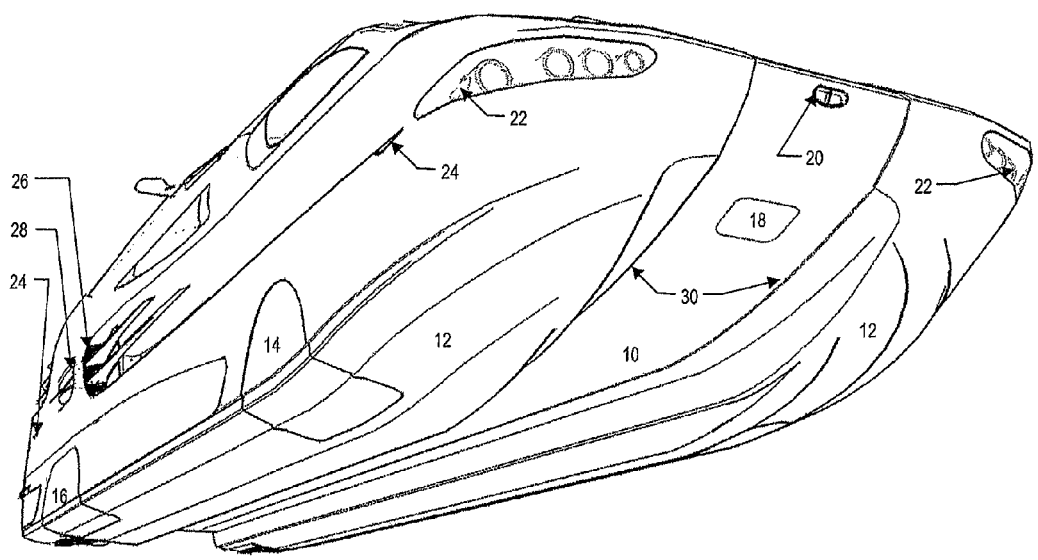
FIGS. 1-4 are perspective views of the Hull Underside and Suspension of an amphibious yacht, according to the present disclosure.

Still other objects and advantages of the present invention will become readily apparent to those skilled in the art from the following detailed description, wherein it is shown and described preferred embodiments of the invention. As will be realized the invention is capable of other and different embodiments, and its several details are capable of modification in various respects, without departing from the invention. Accordingly, the description is to be regarded as illustrative in nature and not as restrictive.

DETAILED DESCRIPTION OF THE DISCLOSURE

The amphibious aspect of the disclosure provides many advantages over similar size 40 to 50 foot yachts. It is not practical to trailer a 40 to 50 foot yacht, so they are usually kept in the water. Docking or mooring a yacht is expensive and during windy days or storms, precautionary measures need to be taken to protect boats from being damaged by wind and waves that can push the vessel against dock structures, cause it to break loose and run aground or sink. Although it is designed to be moored or docked, the amphibious yacht of the present disclosure may not need to be kept in the water. It may be driven in and out of the water every time it travels on water via almost any boat ramp or appropriate inclined surface and stored on land at an owner's property, garage or commercial storage facility. In this scenario, the amphibious yacht of the present disclosure only requires one person to pilot, no deck hands or crew may be needed. Storing the amphibious yacht of the present disclosure on land avoids the potential problem of barnacles and other growth accumulating below the waterline and alleviates the need to paint the bottom with cuprous oxide or similar paint. Once on land, the amphibious yacht of the present disclosure can be driven to a self-service car wash or an automated truck washing facility to remove water spray residue and sea salt, thus significantly reducing corrosion damage. Fuel and service may be obtained at gas stations, truck stops and service garages on land instead of being forced to pay much higher costs for fuel and service at fuel docks, marinas and boat yards. In colder climates at the end of the boating season most owners have to schedule and pay to have their yacht removed from the water and winterized as well as pay monthly storage fees throughout the off season. At the beginning of each boating season, yachts need to be prepared often requiring the bottom to be repainted and launched all at additional expense. Being amphibious, the yacht of the present disclosure may avoid these hassles and be stored where ever it may be convenient. It may also be driven by a single driver to a distant warmer climate much faster, in almost any weather conditions at a fraction of the fuel cost that a conventional motor yacht would require to travel by water. During a long distance water trip paralleling a coastline, if rough ocean conditions are anticipated the amphibious yacht of the present disclosure may be driven on land to avoid these conditions. The amphibious yacht of the present disclosure may allow passengers to park overnight on land thus avoiding sleeping overnight on rough waters. When traveling on canals, rivers or inter-coastal waterways, this vehicle can also avoid low bridges and locks by pulling in and out of the water and going around them.

The amphibious yacht of the present disclosure may have the added benefit of being driven over the road to almost any navigable body of water that has an adequate boat ramp or landing surface. A conventional 40 to 50 foot yacht may be limited by having to depart and return to a home port. For example, a typical day trip following an ocean coastline for a conventional 40 to 50 foot long displacement, deep-V hull yacht could include 3 hours of cruising away from a home port to the midpoint of the trip where the yacht would have to turn around and follow the same course to return home. At an average cruising speed of 15 to 18 mph at the halfway point 3 hours out, the conventional yacht would have traveled about 50 miles. The amphibious yacht of the present disclosure may leave from the same port and achieve planing and cruise at a much faster speeds, perhaps 28 to 33 mph depending on the engine and jet drive components. After 3 hours of cruising at the point where the conventional yacht would have traveled 50 miles and would have to turn around and head home, the amphibious yacht of the present disclosure could travel 90 miles. At this point the amphibious yacht of the present disclosure could continue heading away from the home port at the same speed for an additional hour, traveling a total of 120 miles away from the home port in about 4 hours. At the 120 mile distance, the amphibious yacht of the present disclosure could leave the water via a boat ramp and travel by highway with a 65 to 70 mph speed limit back to the home port in about 2 hours.

Given the same 6 hour round trip travel time, the amphibious yacht of the present disclosure could travel 120 miles of coastline versus a conventional yacht which could only travel 50 miles of coastline before having to return home. A planing catamaran has the potential of being about 20 to 45 percent more efficient than conventional displacement hulls. It is contemplated that the amphibious yacht of the present disclosure, after achieving plane, may travel significantly faster using the same amount of fuel than a comparable size displacement yacht. The amphibious yacht of the present disclosure may be significantly more fuel efficient at the same speed on land than it is at plane on water. Typical 40 to 45 foot diesel pusher class-A motor homes average 6 to 12 miles per gallon at 65 mph, so it is contemplated that the amphibious yacht of the present disclosure with a similar non-hybrid driveline may attain fuel economy toward the higher side of the average due to improved aerodynamics. It is further contemplated that the amphibious yacht of the present disclosure could complete the 240 mile round trip in the example above using about the same amount of fuel as the conventional yacht used to complete a 100 mile roundtrip. With a series diesel electric driveline with in-wheel electric motors, the fuel savings may be even better. This may make the amphibious yacht of the present disclosure much more energy efficient and environmentally friendly than similar size displacement hull power boats and motorhomes. The draft of a catamaran may be significantly reduced when planing and because jet drives have no exposed propellers and do not project below the surface of the hull bottom, the potential of injuring fish, reptiles and sea mammals is significantly reduced. While planing, the amphibious yacht of the present disclosure may displace much less water than similar size displacement hull yachts that travel at the same speed and may cause much less disruption to the water and fragile shorelines by leaving a much smaller wake. These benefits further support eco system sensitivity and environmental friendliness.

Figure 12:
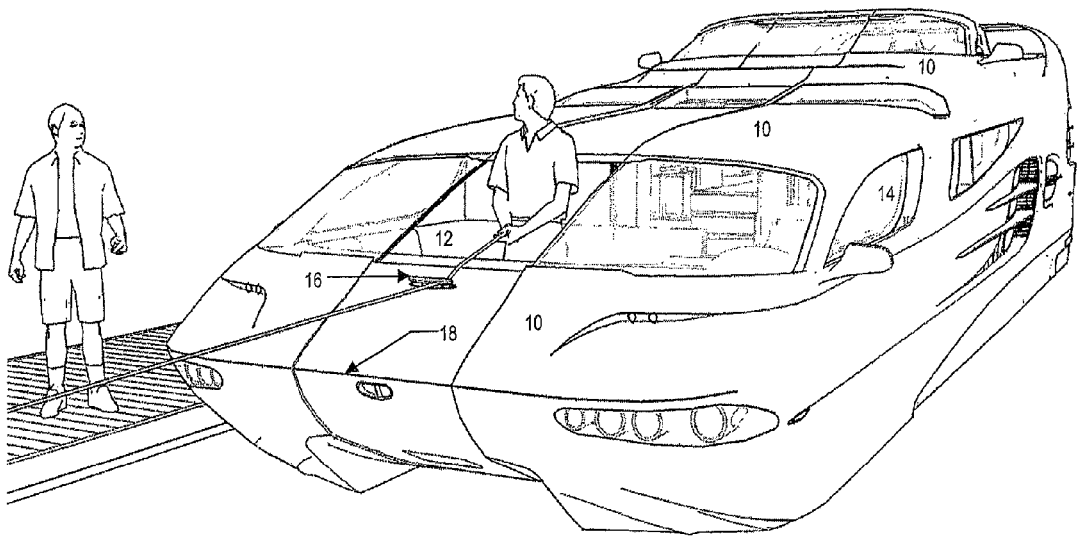
FIG. 12 is a perspective view of the amphibious yacht of FIG. 1 Docking.
Figure 13:
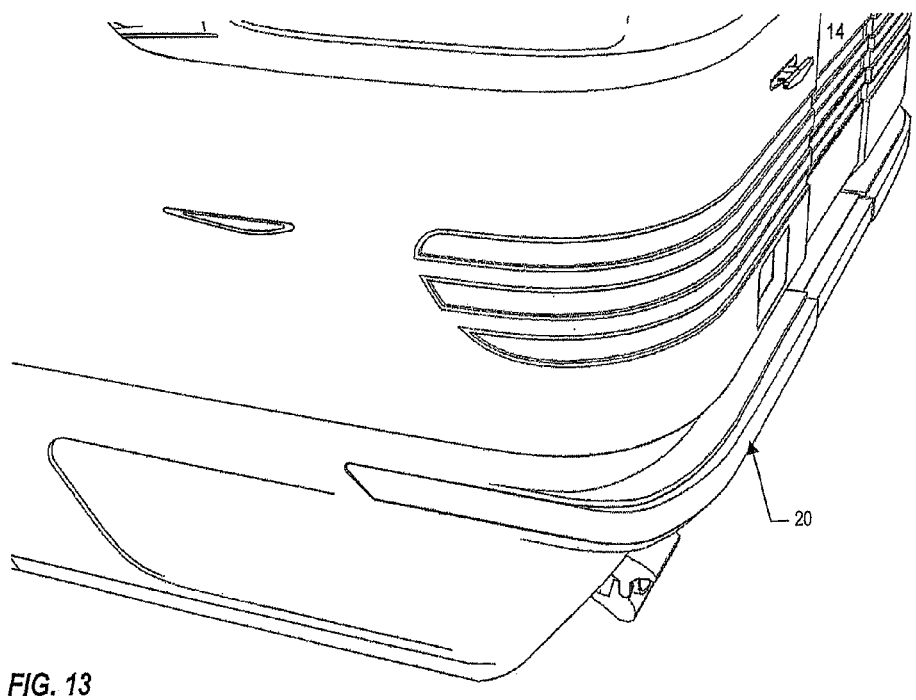
FIGS. 13-15 are perspective views of the Retractable Swim Platform of the amphibious yacht of FIG. 1.
Figure 14:
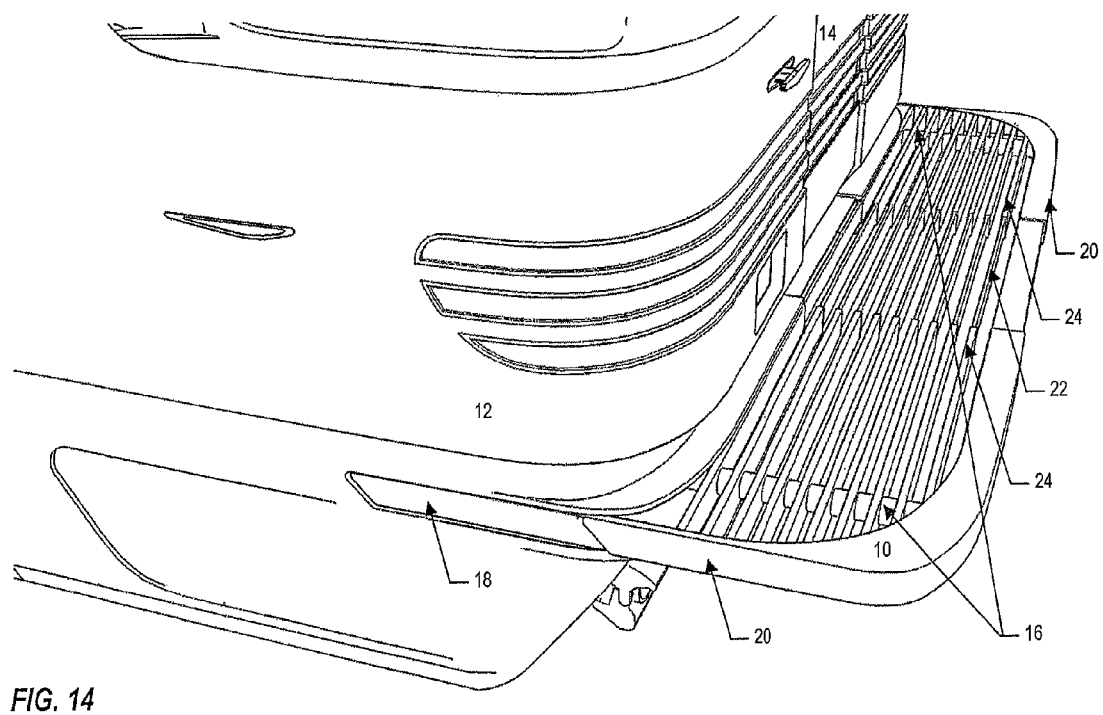
Figure 15:
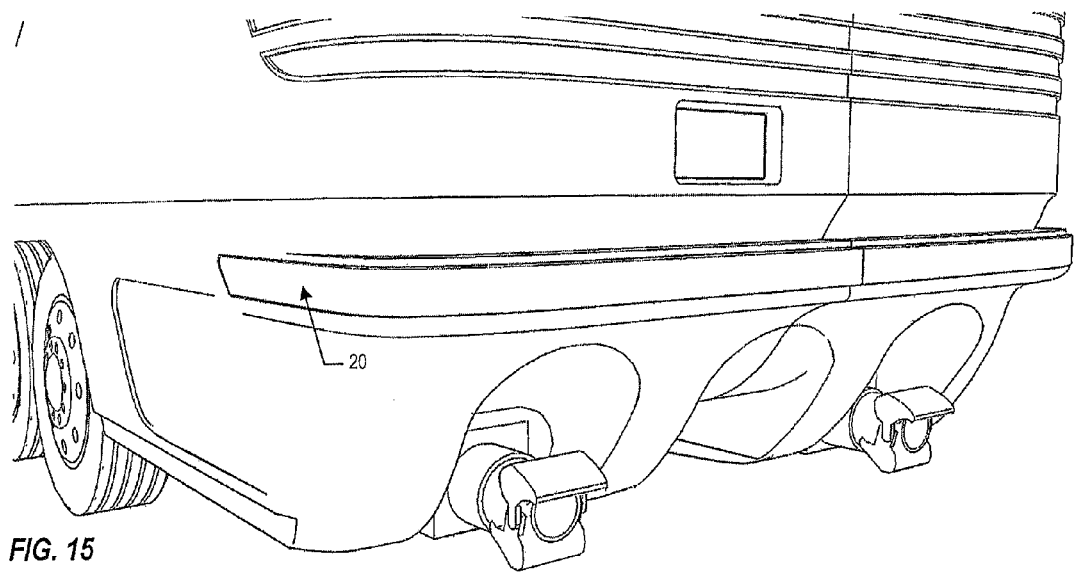

The bow sectional profile above the hull tunnel beginning at the horizontal, leading edge of the forward deck 18 in FIG. 12 is an increasing radius that at its apex matches the increasing radii of both leading edges of the asymmetric monohedron hulls. Once the hull tunnel profile meets the said bow apex, it increases further in radius to meet the top surface of the hull tunnel. The increasing radii of the asymmetric monohedron hulls meet tangentially with the each hull keel. This frontal profile geometry may become more swept back in nature, utilizing larger diameter increasing radii to improve lift and the ability to plane as well as reduce wave drag.

Figure 4:
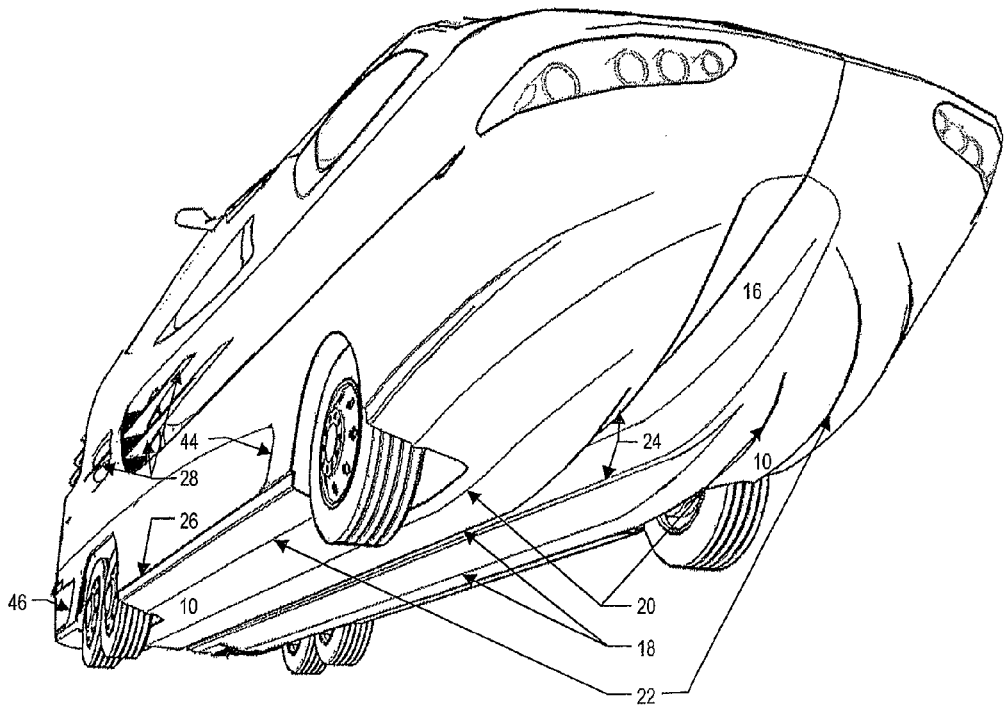

The amphibious yacht of the present disclosure may be configured with two asymmetric, monohedron hulls 10 FIGS. 4, 33. The term "asymmetric" as used herein refers to the gunnels or hull side walls and bottom profile not being symmetrical on both sides of the centerline of each catamaran hull. The term "monohedron" as used herein refers to a running surface that is a relatively constant section profile from front to rear. This may include having a constant deadrise angle from the apex of the bow curve to the middle of the rear wheel wells of 12 to 20 degrees in half degree increments. The FIGS. included herein illustrate a relatively consistent 15½ degrees of deadrise from the apex of the bow curve to the middle of the rear wheel wells. The hull deadrise flattens from the midpoint of the rear wheel well to the back of the rear wheel well in order to create a transition 12 in the hull bottom to meet a flat horizontal plane required for each jet drive intake 14 shown in FIG. 33. The hull deadrise angle and profile may be further modified with hydrodynamic, wave tank testing or sea trials and it is contemplated that the hull may be modified to a warped planing hull design with variable deadrise from behind the front wheel wells to the jet drive intakes 14. Less hull flattening at the jet drive intake or a nacelle may be provided if higher power water jet embodiments in the range of 600 hp or greater are utilized so that at extremely high water speeds the jet drives remain properly submerged. The hull tunnel that separates the catamaran hulls may have vertical side walls that may include at least one or more perpendicular steps that follow a consistent cross-sectional profile roughly parallel to the catamaran keels from the apex of the bow curve straight back to the stern.

Figure 16:
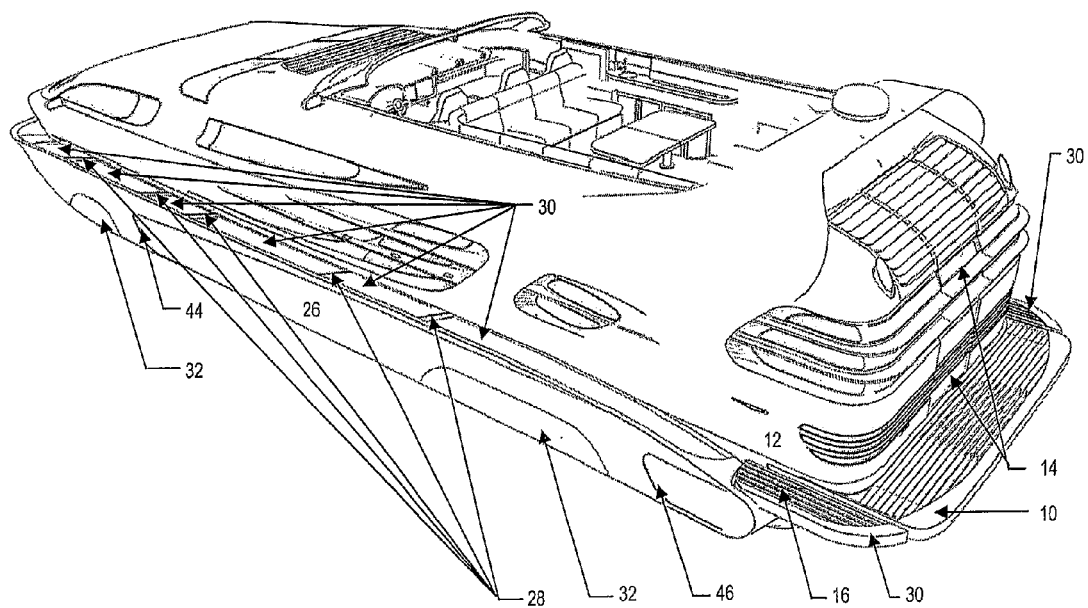
FIG. 16 is a perspective view of the Sponson and Swim Platform of the amphibious yacht of FIG. 1.
Figure 36:
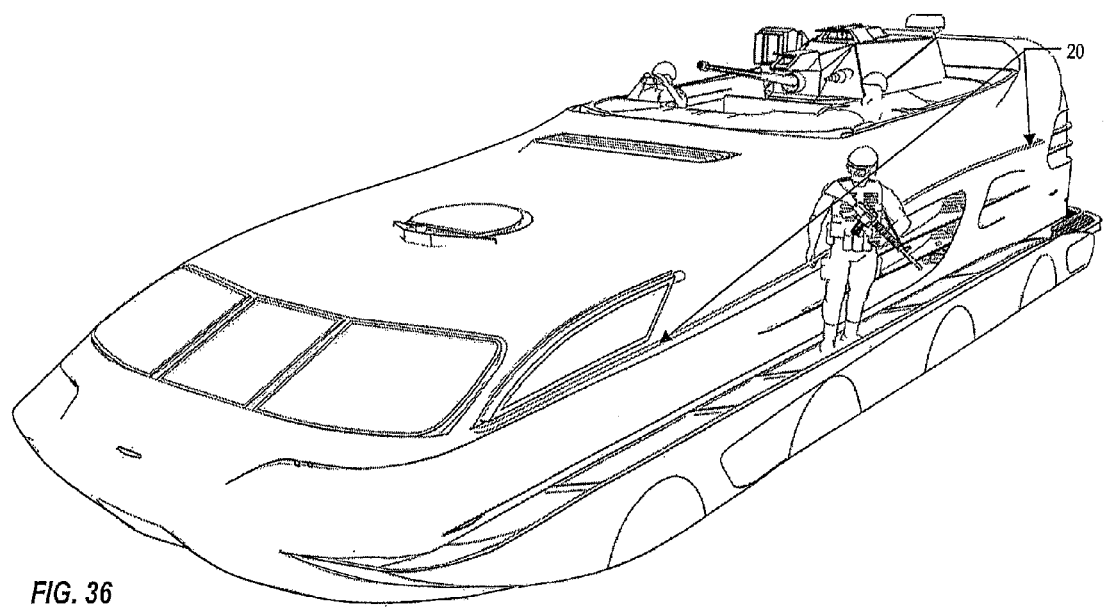
FIG. 36 is a Front Aerial perspective view of a military version with Convertible Top and Windshield fully retracted and sponsons deployed of the amphibious yacht of FIG. 1.
Figure 37:
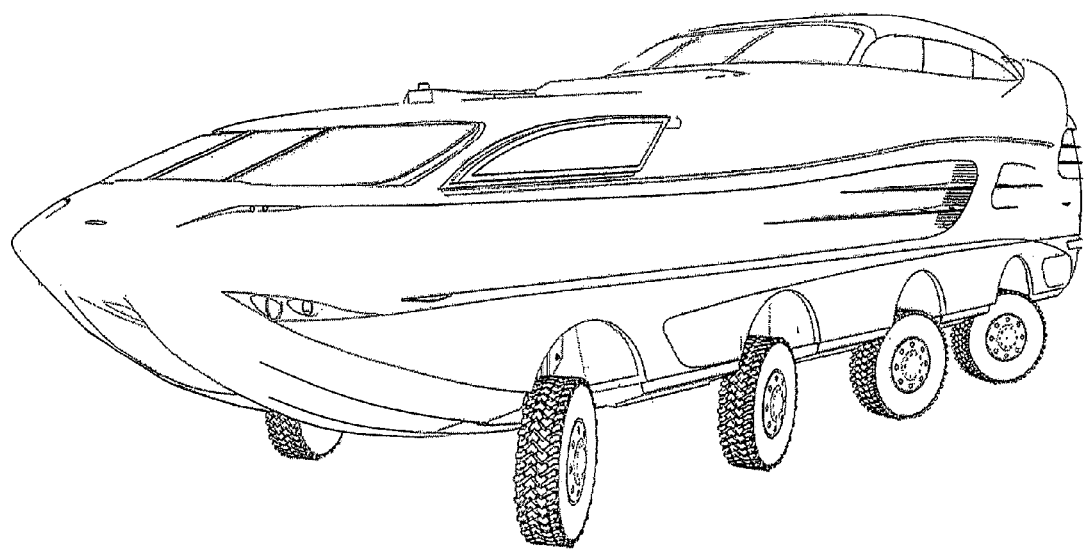
FIG. 37 is a Rear Aerial perspective view of a military version of the amphibious yacht of FIG. 1 with Convertible Top extended and wheels deployed.

The overall beam or vehicle width in FIGS. 1 through 3, 5, 7, 12 and 17 through 19 is 11'-5". The beam width may vary in one quarter inch increments to be either as narrow as 7'-5" for reasons described in Embodiment 7 or as wide as 12'-5" as shown in FIGS. 16, 36 and 37 for wide body models. When the slide-out described in Embodiment 7 is expanded, the hull tunnel clear width 16 in FIGS. 4 and 33 may vary in increments of one quarter inch between 32 inches to 72 inches clear. This range may accommodate travel on the most restrictive roadways as well as provide maximum water stability. The drawings shown in FIGS. 1 through 3, 5, 7, 12 and 17 through 19 have a tunnel width of about 44 inches clear. An increase in tunnel width beyond 60 inches may require a wider overall beam as the catamaran hulls preferably cannot be narrower and provide adequate floatation for an optimal water draft depth and tunnel height and/or metacentric height. A 72 inch wide tunnel may require the overall beam to increase to a minimum of 12'-5" in width and include the retracting sponsons. The vertical tunnel wall height measured from the keel 18 of either catamaran hull to the top of the catamaran tunnel 16 at mid-ship may be at least 5 inches tall to have the ability of trapping air flow in order to create lift and stabilize the tracking of the amphibious yacht of the present disclosure when planing on water. Other minimum tunnel heights contemplated herein are 6 inches, 7 inches, 8 inches, 9 inches, 10 inches, and 11 inches.

A shallow depth tunnel may create a rough, noisy ride as waves slap the top of the hull tunnel. A shallow depth tunnel may require the addition of foils or trim tabs to provide lift for achieving hull planing. A deeper tunnel may be more desirable for water performance, however raising the tunnel height to 28 inches tall or more may compromise interior headroom. The maximum overall height of the amphibious yacht of the present disclosure on the road must be less than 13'-6" to be road legal, therefore the tunnel height may be established in half inch increments of measure to be 6 inches and 42 inches tall and is shown at 18 inches tall in the FIGS. included herein. It is contemplated that the hull tunnel height and the catamaran hull widths shown in the FIGS. may increase as the design undergoes further testing and sea trials.

In addition to the hull tunnel walls, tracking stabilization on water may be enhanced by a continuous garboard strake 20 adjacent to the out board side of the keel as well one or more continuous strakes on the hull bottom 22, as shown in FIGS. 4 and 33. To improve hull planing and stabilization on water, one or more continuous orthogonal, hard chine offsets 24 may run longitudinally down both vertical walls of the hull tunnel. The tunnel wall offset may project in half inch increments between 1½ to 6 inches perpendicularly from the lower vertical face of the hull tunnel. The FIGS. herein include a single 2½" wide wall offset on each side of the hull tunnel. To contribute additional tracking and stabilization in water, a continuous hard chine orthogonal rocker panel offset 26 may be located about 3½ inches above the point where the gunnels meet the hull bottom on the outside of each catamaran hull. The offset shown in the FIGS. herein may be inset from the gunnels ¾ inches horizontally and may be inset as deep as 2 inches or as minimally as ½ inch in quarter inch increments. The height of the offset above the point where the gunnels meet the hull bottom may also vary from 1½ inches to as much as 9 inches in quarter inch increments.

Sheer strakes, 28 (FIGS. 4 and 33-A) with oval shaped eyelets 30 spaced in one half inch increments between 24 and 54 inches on center or 30 inches on center as shown in FIG. 33-B, provide places for bumpers or fenders to be tied to protect the sides of the amphibious yacht of the present disclosure from scraping on adjacent vessels, pilings or other structures when docked. A cover plate 32 in FIG. 33-B that may be hinged on the top edge and held closed with a spring conceals the eyelets when not in use. The eyelets may also serve as hand holds or grabs for crew to hold onto as the sheer strakes guide the vessel during docking procedures. Handrails may also be added as shown on in FIG. 36. The sheer strakes may also help channel air into and out of the air intake 34 and exhaust 36 systems and reduce the potential of water spray hitting fixed windows 38 or entering operable windows 40 and vents shown in FIGS. 33-A and 33-B. Rubbing strakes can be applied over each keel, 18 extending from the transition of the bow curve 42 to the point where the keel ends at the beginning of the hull transition 12 to the water jet intake. This may help protect the hull from minor scrapping damage that may occur during water or land travel.

The swept-back geometry of the windshields, skylights and forward decks blend together to make a cohesive interrelated geometry that interacts with the inclined angles, curved radii and rounded surfaces of the catamaran bow and curved catamaran hull tunnel bow. Together these create some of the key features of the streamlined structure. Other rounded exterior surfaces including inside and outside corners, roofs, decks, rear valances and transom further contribute to streamlining. The streamlined structure of the amphibious yacht of the present disclosure may significantly reduce aerodynamic and hydrodynamic drag, as well as the formation of eddies and turbulence in the water and air that pass over the outer surfaces of the amphibious yacht. Streamlining, as applied to the amphibious yacht of the present disclosure, may significantly contribute to achieving planing on water. The swept-back, smooth surfaces in conjunction with design features noted in Embodiment 1, may allow the amphibious yacht of the present disclosure to travel through air and water much more efficiently than similar sized prior art amphibious vehicles and contribute significantly to energy efficiency and being environmentally conscious.

It is contemplated that modifications to overall body and hull forms and to specific component geometries and profiles may be made to enhance aerodynamics and hydrodynamics with future water and wind tunnel testing.

Details of the longitudinal section profile depicted in FIGS. 8-11 support streamlining and, in some cases, the potential for the amphibious yacht of the present disclosure to plane on water. The horizontal edge 18 in FIG. 12, where the leading edge of the tunnel bow meets the forward deck 10 in front of the windshield 12, may be considered the top of the bow. As depicted in the FIGS., the top of bow height measured vertically from the bottom plane of the keels 18 in FIG. 4 is about 4'-9". This height could be as little as 4'-0" or may proportionally follow any increase of hull tunnel height noted previously. It is contemplated that the amphibious yacht of the present disclosure may be designed to handle rougher seas when wave tank testing or sea trials are completed or to channel more air into the catamaran tunnel, by increasing the bow height by as much as 24" to be 6'-0" above the bottom plane of the keels. The range of potential bow height may be determined in half inch increments between 4'-0" and 6'-0" above the keel. The angle starting at a horizontal datum at the centerline of the amphibious yacht of the present disclosure, where the leading edge of the tunnel bow meets the forward deck in front of the windshield to the top of the windshield, is about 27 degrees in the FIGS. This angle and the inclination angle of the flybridge windshield may be as minimal as 23 degrees or as large as 37 degrees in half degree increments. In the FIGS., the flybridge windshield slope may match the slope of the main deck forward windshield. The angle, starting at a horizontal datum at the centerline of the amphibious yacht of the present disclosure, where the leading edge of the arched tunnel bow meets the forward deck in front of the windshield to the point where the curved tunnel bow meets the horizontal top surface of the tunnel, is about 24½ degrees in the FIGS. This angle may be as minimal as 14 degrees or as large as 33 degrees in half degree increments. From the centerline of the amphibious yacht of the present disclosure, the vertical dimension from the point where the curved tunnel bow meets the horizontal top surface of the tunnel to the rooftop is 6'-6" in the FIGS. This vertical dimension may be as minimal as 5'-8" or as tall as 8'-0" in increments of one quarter inch, depending on the desired clear headroom inside.

Vents 44 and 46 behind each front and rear wheel well as shown in FIGS. 4, 16 and 33 may allow water trapped in wheel wells after the front and rear wheel well covers are closed to drain when achieving plane or exiting the water. The functionality of these vents becomes more important if the pump system described in Embodiment 4 is not installed. The vents may also include a back flow prevention valve, baffle or flap device to keep water from entering wheel wells thru the vent. The back flow prevention device may allow water to exit the wheel well by force of gravity when the water level outside the amphibious yacht of the present disclosure is lower than the water level inside the wheel well housings.

Figure 7:
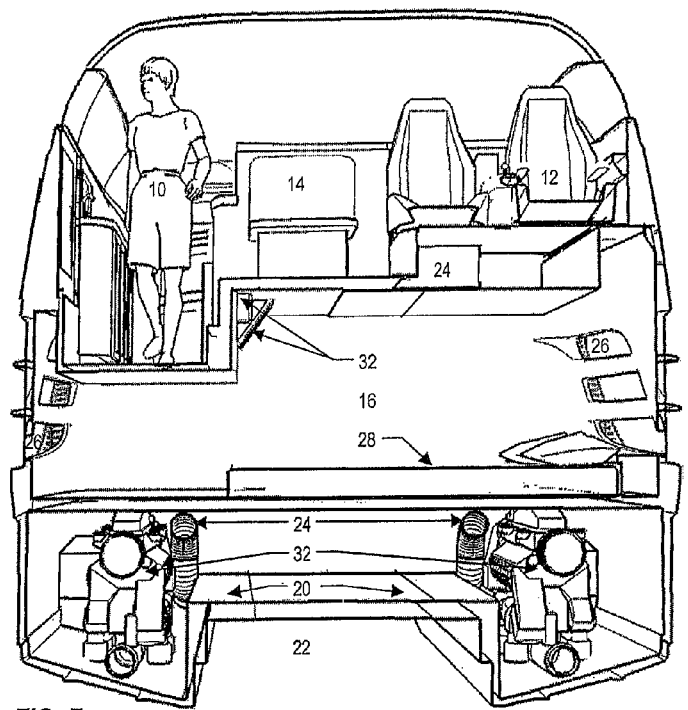
Figure 8:
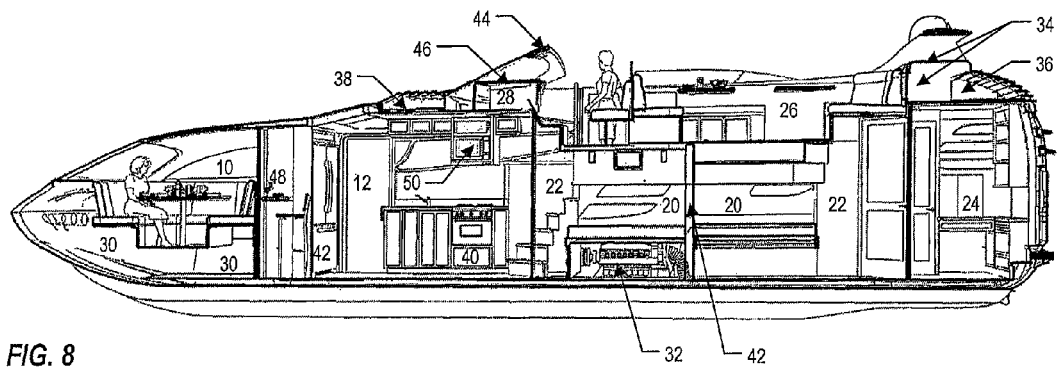
FIGS. 8-11 are longitudinal cross-sectional views of the amphibious yacht of FIG. 1.
Figure 9:
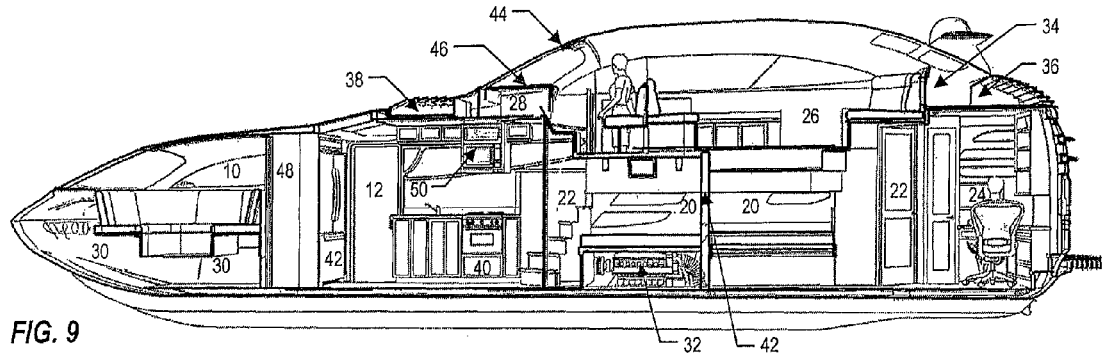

The amphibious yacht of the present disclosure may be powered by twin diesel engines mounted as low in each asymmetric catamaran hull as is practicable 32 in FIGS. 7-9. FIG. 7 illustrates a potential location 20 for battery arrays and generator on top of the hull tunnel 22 in the engine bay; the engine exhaust system 24 may run to the stern through each catamaran hull. From the stern, the exhaust system 54 may extend up through the roof at the rear of the amphibious yacht of the present disclosure as shown in FIGS. 33-A and 35. Two approximately 200-400 gallon fuel tanks and tanks for approximately 180 gallons of potable water, 90 gallons of gray and 90 gallons of waste water may be located toward the bottom of the catamaran hulls to keep the center of gravity low. Access for filling fuel and water tanks and draining waste tanks as well as utility connections including electrical, telephone, data and cable connections may be concealed behind an access door 52 shown in FIG. 33-B on each side of the amphibious yacht of the present disclosure. The door may be hinged on the bottom or top and may lock in place when fully opened or closed. As shown in FIGS. 8 through 11, as the vessel is tested further, including sea trials, the engines, power generation and storage devices, fuel tanks and other heavy weight components may be arranged to create an optimum longitudinal center of gravity with a particular interior and body configuration as to increase water speed and performance.

Most 40 to 45 foot long Class A motor homes have single 350 to 500 horsepower (HP) engines. In order to provide higher water speeds for the amphibious yacht of the present disclosure, more than one engine size embodiment may be available. Each engine may be at least 300 HP and even exceed as 600 HP. Transmissions located behind each engine may be 6 speed automatics. The amphibious yacht of the present disclosure may have an independent suspension system meaning that an axle attached to wheels on one side of the amphibious yacht of the present disclosure may not be directly connected to wheels on the opposite side. An independent suspension system may allow the port or left side driveline to drive one or possibly both rear wheels on the port or left side. Likewise the starboard or right side driveline may power the starboard or right hand wheel, or possibly the pair of right wheels. Power take-offs may bypass the transmission gearing and turn shafts to power water jet propulsion systems 20 in FIG. 33 located at the stern, rear transom tunnels. The water jets may feature a joy stick control system to make engine synchronizing and navigating as easy as possible, particularly for less experienced pilots. For most land travel, only one driveline may be needed, even at highway speeds. For towing heavy loads, climbing extremely steep terrain or potentially achieving speeds higher than other production motor homes, the second driveline may be engaged and engine RMPs may be matched via an automatic synchronization system to provide combined engine power of approximately 600 to 1,200 horsepower depending on the engine sizes. On the road, the streamlined, aerodynamic body and undercarriage powered by a 300 hp or slightly larger diesel engine or hybrid engine with a 6 speed transmission may produce a significantly higher level of fuel economy than typical, similar size diesel Class A motor homes. The elements that increase energy efficiency may also reduce the carbon footprint of the amphibious yacht of the present disclosure making it more environmentally sensitive.

The suspension may include two sets of rear wheels, one in front of the other, on each side of the amphibious yacht of the present disclosure to increase the load carrying capacity. This arrangement may be preferred over dual wheels, which have a pair of wheels mounted side by side on the same axle on each side of the vehicle. This preferred rear wheel arrangement may use less cross-sectional space within each catamaran hull and allow more space for driveline components and systems inside the hull to pass around the wheel wells. This arrangement may reduce the overall front facing profile improving the amphibious yacht of the present disclosure aerodynamically and reduce environmental impact to unpaved ground surfaces by having all tires on each side of the vehicle tracking in a single footprint. The wheel base dimensions are intended to place the front and second set of rear wheels close enough to the front and rear of the amphibious yacht of the present disclosure as to provide clearance to keep the bow and rear bumper, water jet drive and transom from scraping on transitions from flat to steeply sloped grades or ramp inclines. The rear wheels may also be located so as to provide adequate space for the water jets and the hull transition from deadrise angle to flat horizontal. It is contemplated that the rear wheels may be located relatively close to the engine and transmission components to achieve optimal balance relative to the longitudinal center of gravity. The clear space between the front and first set of rear wheels is 22'-6" as shown in the FIGS. This dimension may be shorter but should not be larger than 27 feet as the amphibious yacht of the present disclosure could be at risk of scraping hull keels at mid-span of wheel base on grade surface peaks or humps. The Safari Wheeled Amphibious Vessel (SWAV) and the Military Amphibious Vessel (or Vehicle) MWAV are contemplated to have 6, 8 or 10 wheel configurations that add additional pairs of wheels between the front and rear wheel locations established for the 6 wheel of the amphibious yacht of the present disclosure.

Similar length production Express Cruiser Yachts and Class "A" Motor Homes typically have 1 or 2 sleeping rooms and bathrooms and provide sleeping and dining capacity for approximately 4 to 6 guests. The amphibious yacht of the present disclosure may offer significantly greater accommodation potential, including sleeping capacity for 10 or more guests in up to 4 full beam or vehicle width sleeping rooms. Space onboard may also be available for 3 bathrooms, each equipped with self-contained showers, sinks and toilets. The amphibious yacht of the present disclosure also has the capability to accommodate a sit down meal for 20 guests.

The amphibious yacht of the present disclosure may also include any number of the following 14 embodiments that are unique, innovative in utility and/or design elements. Although each embodiment can be beneficial, the success of the amphibious yacht of the present disclosure is not dependent on having all of the following embodiments:

Embodiment 1

Figure 2:
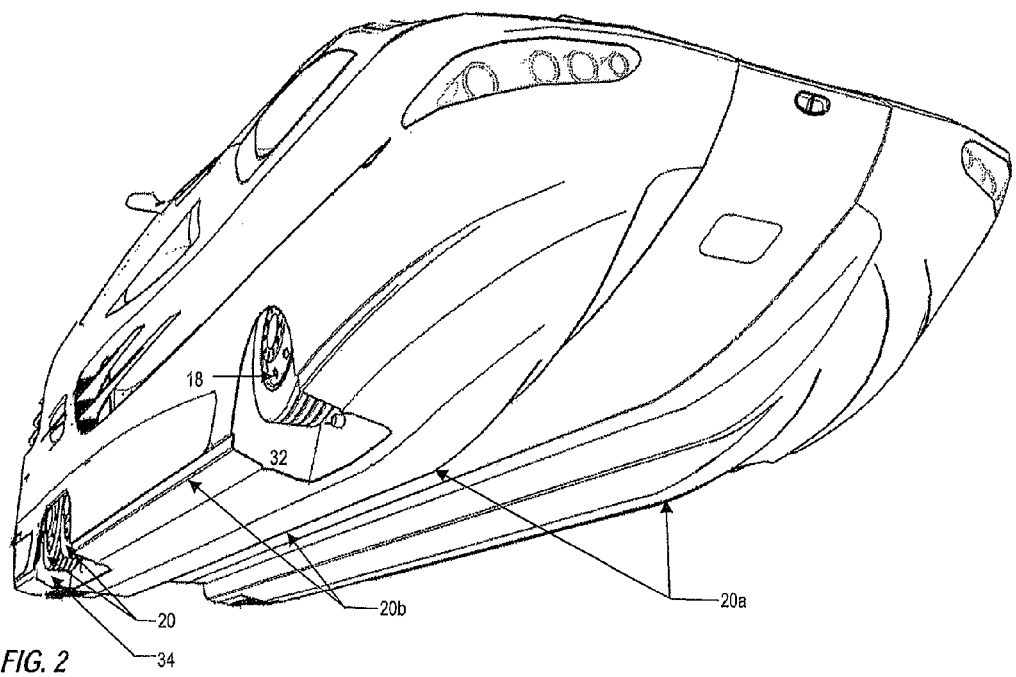
Figure 3:
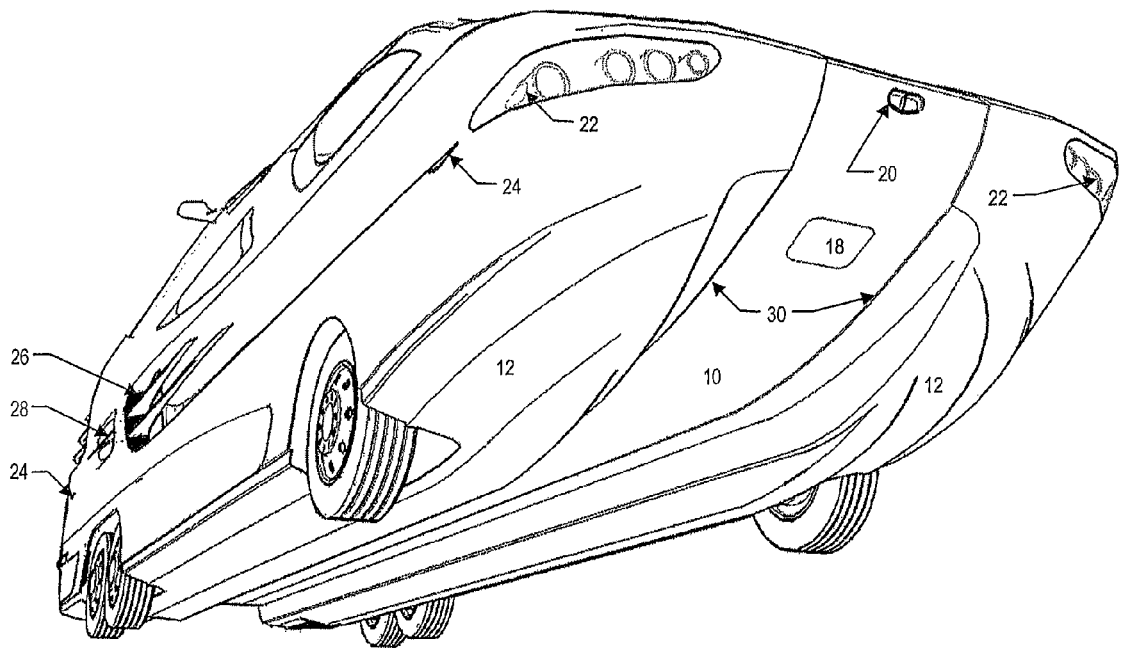

FIGS. 1-3 illustrate hull or body features above and below the waterline that may contribute to maximizing hull planing by creating lift, reducing wetted profile and drag, and improving hydrodynamic and/or aerodynamic characteristics. Key features include a continuous hull tunnel 10 that separates two asymmetric monohedron hulls 12, each of which may have constant deadrise 20b from the apex 20a of the bow curve to the rear wheel wells. The anchor and anchor locker may be concealed behind a motorized door 18 that may be flush with the hull profile. Windshield wipers may retract underneath body surfaces below the windshields. Red and green colored bow lights 20, distance sensors, cameras, headlights, driving lights, infrared and/or fog lights, turn signals, red and green marine side marker lights 22, retracting rope cleats 24 as well as engine compartment intake vents 26, exhaust vents 28, and heating and air conditioning units may be recessed into the hull or body to create a flush body profile. Exposed edges of watertight seams 30 may be made unobtrusive, as shown. FIGS. 1 and 2 illustrate that all drive train, suspension components, front wheels 18 and rear wheels 20 when retracted into front and rear wheel wells 32, 34 may be located within the hull envelope profile to reduce hydrodynamic drag.

Embodiment 2

Figure 5:
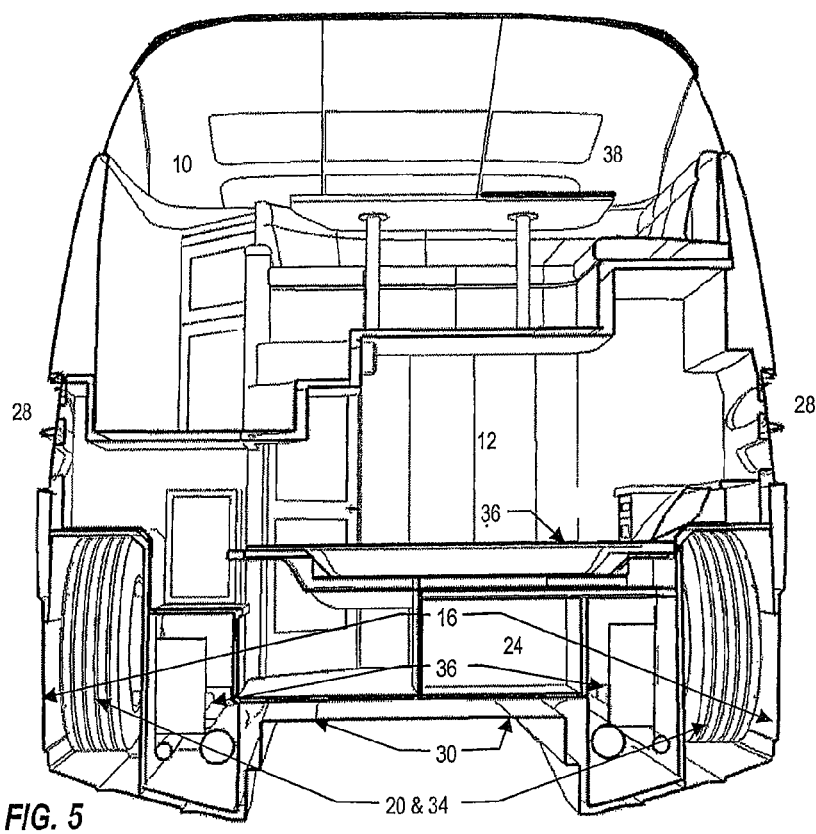
FIGS. 5-7 are lateral cross-sectional views of the amphibious yacht of FIG. 1.
Figure 6:
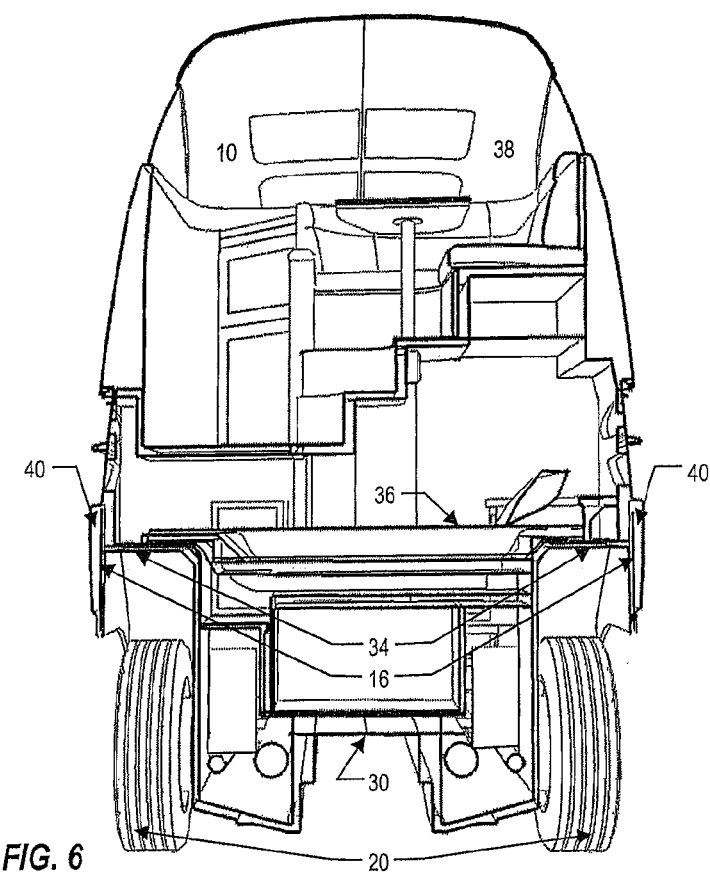

Before making landfall during water travel, as shown in FIGS. 1, 2, 5 and 6, front and rear wheel opening covers 14 and 16 that conceal the front wheel wells 32 and rear wheel wells 34 may be flush with the outer face of the hull and may retract. As shown in FIGS. 5 and 6, this may allow the front wheels 18 and rear pair of wheels 20 to extend down from wheel housings or wheel wells 32, 34 housed inside the hull or body profile, as shown in FIGS. 3 and 6.

Embodiment 3

To overcome problems, exposed wheel opening covers that slide or retract outside the hull or body may have the design such as is described by U.S. Pat. No. 4,958,584. Wheel well opening covers 14, 16, as shown in FIGS. 1, 5 and 6 may retract to their open position inside concealed pockets 40 within the hull or body. When open, wheel housing covers that are concealed within the body may reduce exposure to dirt, mud and debris as well as minor collisions or damage from pilings when docked on water. Such exposure and collisions may inhibit or disable the movement of exposed wheel well opening covers. Concealed wheel opening covers may eliminate negative aerodynamic effects, including increased drag and noise that exposed wheel opening covers may exhibit when traveling on land. When traveling on water, concealed wheel opening covers may alleviate the negative hydrodynamic effects, including increased drag, created by exposed tracks and hardware required for exposed wheel opening covers to slide on. When on land, concealed wheel opening covers may create a much simpler and more pleasing aesthetic appearance than exposed covers, adding market appeal.

Embodiment 4

To increase vessel buoyancy, as shown in FIGS. 1, 2 and 5, wheel opening covers 14, 16 may close with watertight seals, allowing water trapped inside the wheel housings or wheel wells 32, 34 to be pumped dry.

Embodiment 5

The second level, open or enclosed deck that bridges over a portion of one or more compartments, cabins, rooms or beds on the main deck below may increase usable floor area and may also increase the number of private spaces that could be used as sleeping rooms. This "Bridging Deck" may allow passengers or goods to move between or around these independent areas while leaving ample, uninterrupted space for living, storage or sleeping functions etc. within the spaces being bridged. FIGS. 17-23 illustrate that one or more beds 32 of any size may be located in sleeping spaces 14 and 16 and used effectively under the Bridging Deck 20. The Bridging Deck, in conjunction with stairways 22 may allow for a circulation space with full headroom over the sleeping spaces. As illustrated in FIGS. 8-11, the bridging deck 26 with the stairs at both ends 22 may effectively bridge over sleeping spaces 20. The overall height of the amphibious yacht of the present disclosure may meet roadway height requirements and provide adequate functional ceiling heights for each space located on or below the Bridging Deck. FIG. 5 shows the rear cabin 12, which has the full body slide-out (described in Embodiment 7) which has an adjustable height bed 36 in its lowest position. This position may allow additional leg room at the foot of the bed when the amphibious yacht of the present disclosure is expanded to its maximum overall beam width. Before the amphibious yacht of the present disclosure is retracted to its narrowest overall beam width, as shown in FIG. 6, the motor operated bed 36 may be raised high enough to provide clearance over the wheel well housings 34. In the raised position, the bed may include enough leg room for the bed to function.

The amphibious yacht of the present disclosure as depicted in FIGS. 17-22 includes two or more isolated cabins or suites of spaces 14, 16 that may have a private feel in regard to circulation, sightlines and audible noise. A luxurious private cabin suite may lend well to commercial chartering because passenger areas are isolated from crew quarters, as well as from storage and utility areas. As shown in FIGS. 5 and 6, there may be additional, non-standing height space 38 adjacent to the Bridging Deck circulation space 10 that can be used for storage, lounging 38, a sleeping area 40 with beds 42 in FIG. 27, or helm seating (see 36 in FIGS. 10, 11 and 27). This configuration may also allow ample height for spaces below 20 the Bridging Deck to function. FIGS. 8-11 show the Bridging Deck that may include one or more full-beam width, watertight bulkheads 42 that may seal the hull from the hull bottom to the underside of the Bridging Deck to compartmentalize the hull. In the event of a hull breach, flooding may be isolated to the compartment where the breach occurs. Compartment space on the opposite side of the watertight bulkhead from the breached area may remain watertight, providing floatation support and potentially keeping the vessel from sinking.

Embodiment 6

Figures 23, 24, 25:
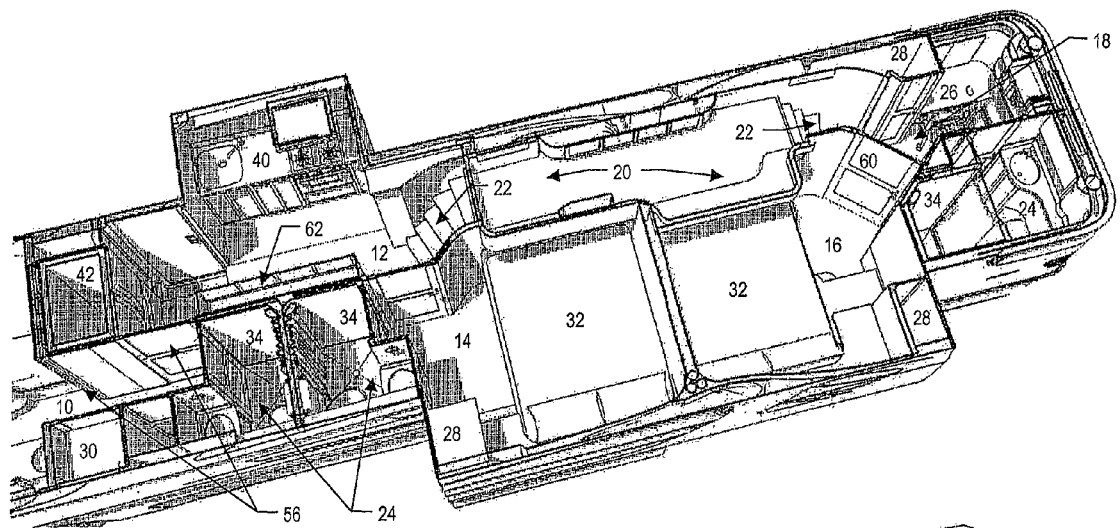
FIGS. 23-25 are Recreational Vehicle perspective views Slide-Out Embodiments of the amphibious yacht of FIG. 1.

FIGS. 23-25 depict a Bridging Deck 20 that may be used with other non-amphibious recreation vehicles including trailers, campers and motor homes that may have a fixed, 8'-6" or less overall width. The description of spaces in Embodiment 5 is also applicable to the spaces in this embodiment and in FIG. 23. FIGS. 23-25 illustrate that this version of the Bridging Deck may utilize one or more conventional slide-outs on a vehicle that has a fixed width less than 8'-6" overall. This may allow additional floor area and ceiling height for sleeping areas or other types of spaces located below Bridging Deck levels when the vehicle is parked.

Embodiment 7

FIGS. 1, 5 and 6 indicate the location of water-tight seams 30 that may run continuously around the entire amphibious yacht of the present disclosure. These seams may allow the overall width of the amphibious yacht of the present disclosure to retract in order to meet regulatory restrictions in the US or other countries. To meet all US regulations currently known, the amphibious yacht of the present disclosure may have an overall beam or vehicle width of 8'-5" when the amphibious yacht of the present disclosure is fully retracted, as shown in FIG. 4. The overall beam width may need to be reduced further to as little as 7'-5" for travel on densely populated urban roadways or to meet more demanding roadway regulations and restrictions that may exist or be put into effect in the US and globally in the future. When the slide-out is retracted to reduce the overall beam width of the disclosure to 8'-5", the hull tunnel may be about 15 inches wide. If the amphibious yacht of the present disclosure is modified to a retracted slide-out width of 7'-5" overall, the hull tunnel width in the retracted position may be about 3 inches clear or less. The slide-out function may only operate on land when rolling forward or backward at a very low speed to reduce lateral friction on the tires. Retracting or extending the body halves on land may alleviate the need for the seam along the slide-out to maintain high levels of resistance to water pressure, as would be required if the slide-out was operated on water. This may also insure that the amphibious yacht of the present disclosure may be expanded to full width in the water providing maximum water stability. The slide-out may be activated by a number of synchronized hydraulic pistons and guided along perpendicular tracks, gears or seams to keep the two halves of the amphibious yacht of the present disclosure parallel to each other before, during and after operation. Unlike other collapsible catamarans with folding or collapsible exposed superstructures that connect two independent water-tight hulls, such as in U.S. Pat. No. 6,546,885, when the hull of the amphibious yacht of the present disclosure may be retracted or extended to full width, both catamaran hulls and the enclosed area of expansion above the central hull tunnel may create a contiguous watertight hull across the full beam width for increased cargo, passenger or accommodation capacity.

Embodiment 8

Rigid Hulled Inflatable Hypalon® Sponsons may project from the amphibious yacht, including the Safari Wheeled Amphibious Vessel (SWAV) and the Military Amphibious Vessel (or Vehicle) (MWAV) of the present disclosure to increase buoyancy. Upon entering the water, when the vessel is afloat, the wheels may be retracted into the wheel wells. With the wheels retracted, both rigid hulled sponsons 26 shown in FIG. 16 may slide out on multiple internal, concealed tracks 28 to deploy. At this point or anytime while traveling, the swim platform 10 described in Embodiment 9 can be deployed or retracted. Once the sponsons are deployed, the swim platform extensions 30 may also be deployed from pockets within the sponson rigid shell housing. Wheel well opening covers 32 described in Embodiment 2 may slide into place to cover the wheel wells when the sponsons are retracted or deployed. When the sponsons are in place with the wheel covers closed, multiple air filled Hypalon® tubes 30 inside each sponson may inflate in seconds to displace water from the sponsons and increase buoyancy. Additional air-filled Hypalon® tubes may deploy inside wheel wells to displace water and increase buoyancy as an option to Embodiment 4.

When the vessel has attained planing speeds on calm waters, to reduce hydrodynamic and aerodynamic drag and attain increased top water speed, the sponsons can be retracted. To transition back to land travel mode, the same sequence used to enter the water may be performed in reverse order.

Embodiment 9

FIGS. 13-16 illustrate a rear bumper that expands to function as a swimming platform or as additional deck space for fishing and water skiing, when extended. Fabricated using preferably non-corrosive metal hardware, plate and tubing, the swim platform 10 may feature a structure that extends out from the hull or body 12 to create a useful platform for entering or exiting the rear exterior sliding pocket door 14. Extension and retraction of the mechanized swim platform may be activated by two or more cylindrical hydraulic pistons 16. Extension and retraction actions may also be guided by metal plate or rectangular tube guides 18 at the starboard and port edges that may be fixed at their leading ends to the hull or body 12. The trailing ends of the guides 18 may slide into larger rectangular tube perimeter frames 20 that wrap the side and rear perimeter of the structure. If the amphibious yacht of the present disclosure includes embodiment number 7, a full vehicle slide-out, the swim platform may have an additional capability of expanding and retracting along the centerline of the vessel. This additional platform area may expands or contract along plates or tubes 22 that fit within the rectangular field tubes 24 that make up the majority of the deck platform. The top facing, walking surfaces may be knurled, peened and/or coated to create a slip resistant surface.

As shown in FIG. 16, when the retracting sponsons are added, an additional section of swim platform 10 may collapse into its outer frame by transverse mounted, hydraulic pistons 16 that fit within the profile of the platform grates. When collapsed, the platform may retract along a guide track on the side of the rear swim platform 10 into the transom of the sponson shell where it will provide enough clearance for the sponson to retract into the hull/body 12. The additional swim platform may serve a key functional role of creating a deck that connects the swim platform to the deck surfaces that run the full length of both sponsons, making all three sides of the vessel accessible from the rear transom door or starboard side door. FIG. 12 shows one or more operable windows 12 and 14 in the forward salon that may grant access to the bow and may minimize the need to walk on the roof or forward decks 10. The window in the center of the main deck forward salon windshield 12 may retract up into the salon roof providing access to the center of the bow and the rope cleat centered on the bow. Windows 14 on both sides of the salon may retract down into the walls or gunnels of the vessel below. The retractable windshield 44 is also shown in FIGS. 17-22. With the windshield retracted and the sponsons and swim platform deployed all sides, the vessel may be accessed by deck hands to perform all boat handling functions including fending, docking, mooring, tying lines to retracting rope cleats, tying bumpers/fenders and other essential functions that boats typically require.

Embodiment 10

Figure 34:
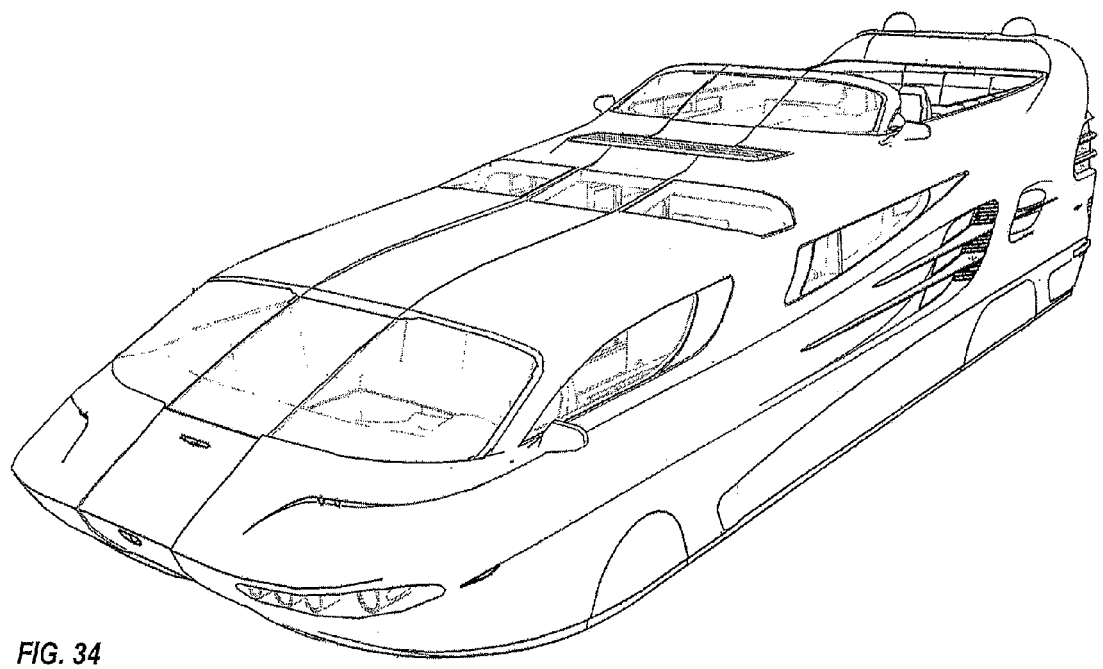
FIG. 34 is a Front Aerial perspective view with Convertible Top and Windshield partially retracted of the amphibious yacht of FIG. 1.
Figure 35:
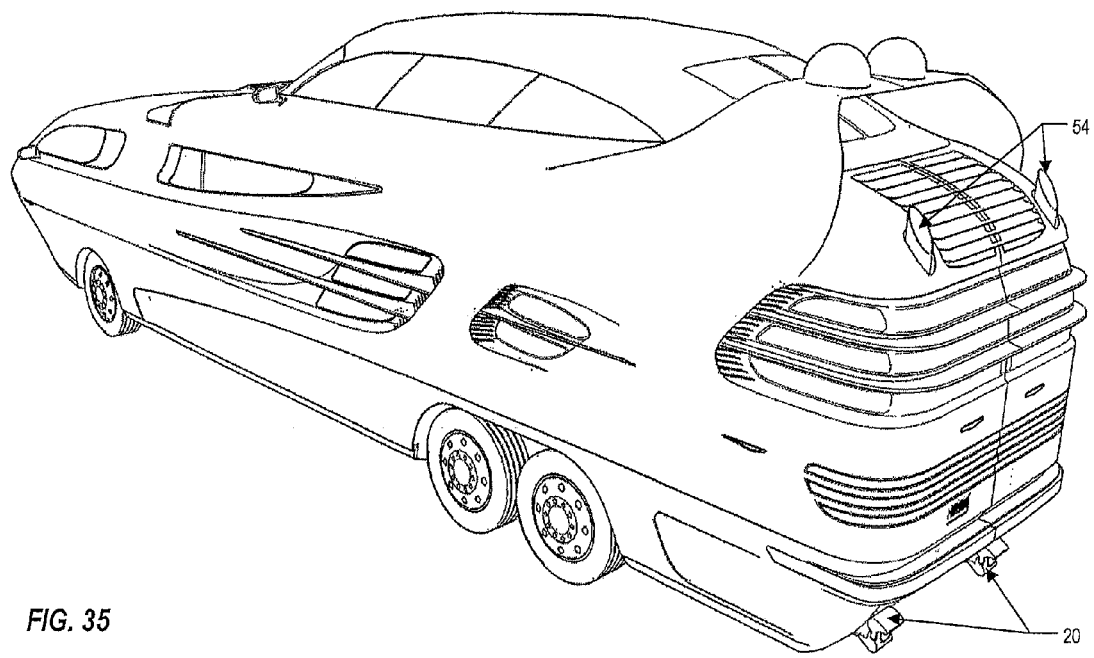
FIG. 35 is a Rear Aerial perspective view of the amphibious yacht of FIG. 1 with Convertible Top extended.

A retracting windshield 44 is shown in its partially retracted state between the dashboard 46, life jacket storage 28 and concealed air conditioning unit 36 in FIG. 8. By retracting the convertible roof into a recessed area in front of the radiator and air conditioning unit housing 36 and concealing it with a boot cover 34, the flybridge cockpit achieves an open air "Roadster"-like feel. (See FIG. 34). FIG. 36 shows the windshield fully retracted into a pocket in the roof.

Embodiment 11

Figures 17, 18, 19A:
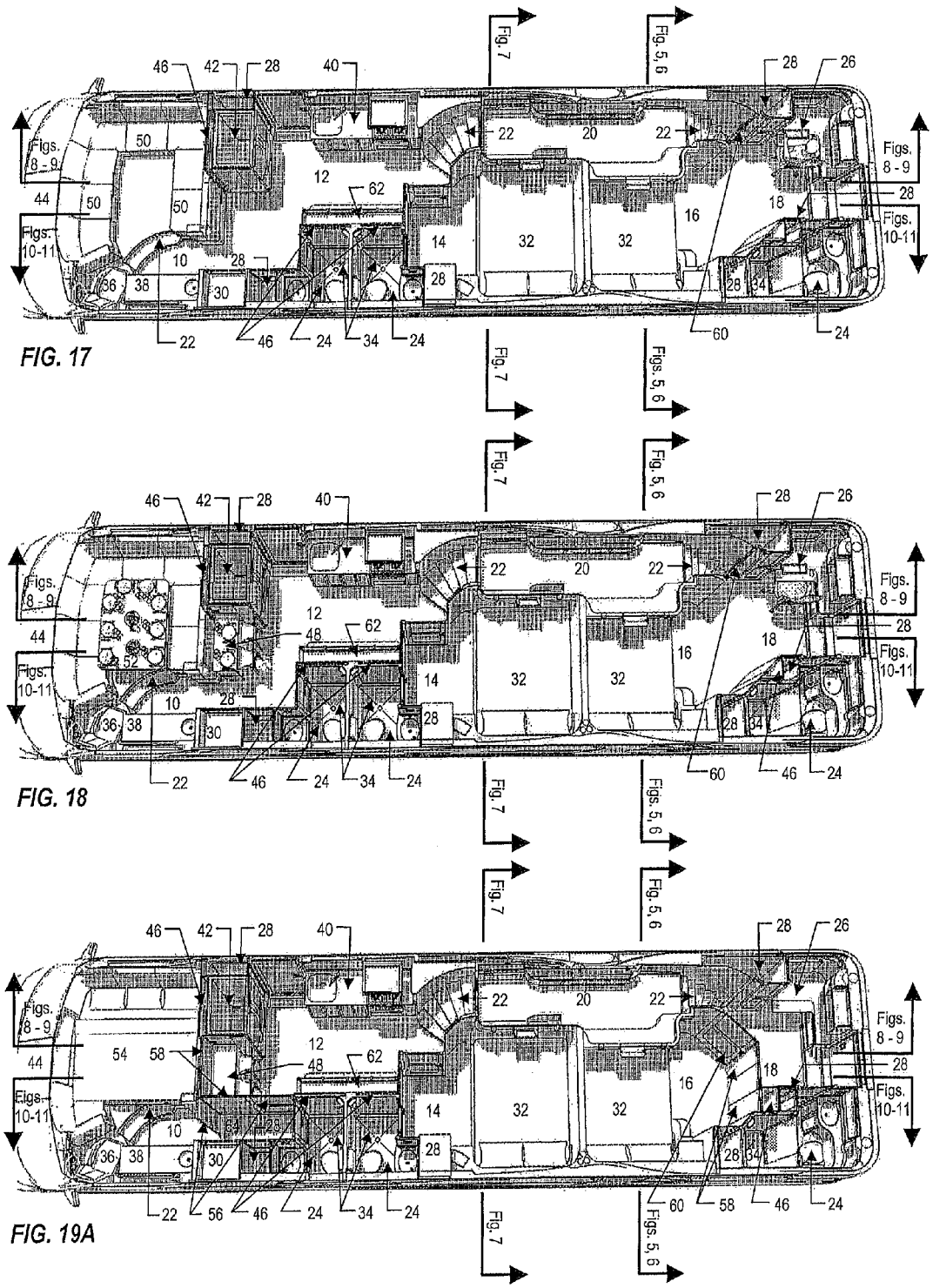
Figure 19B:
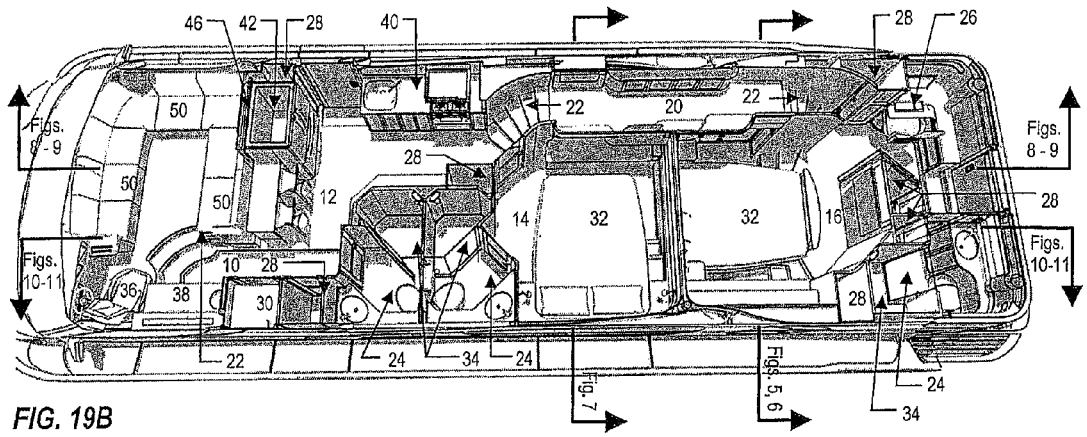
Figure 20:
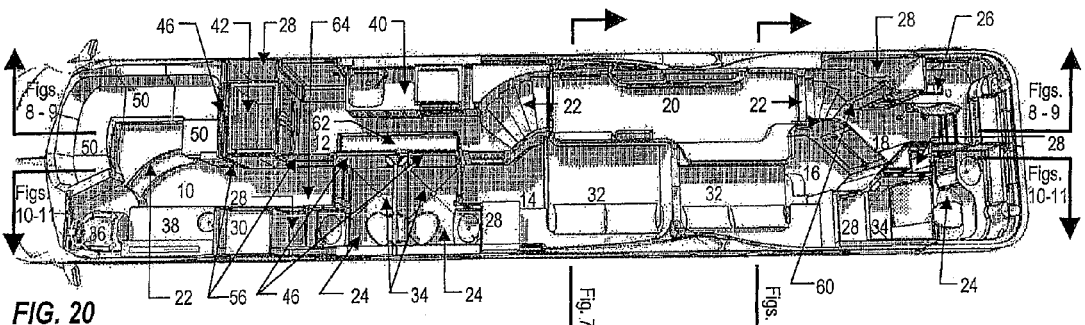
FIGS. 20-22 are Main Deck Plan Views of the Retracted Overall Beam Width of the amphibious yacht of FIG. 1.
Figure 21:
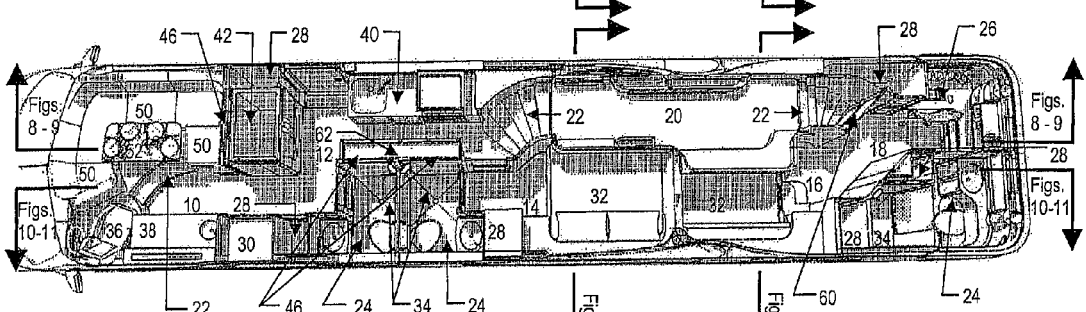
Figure 22:
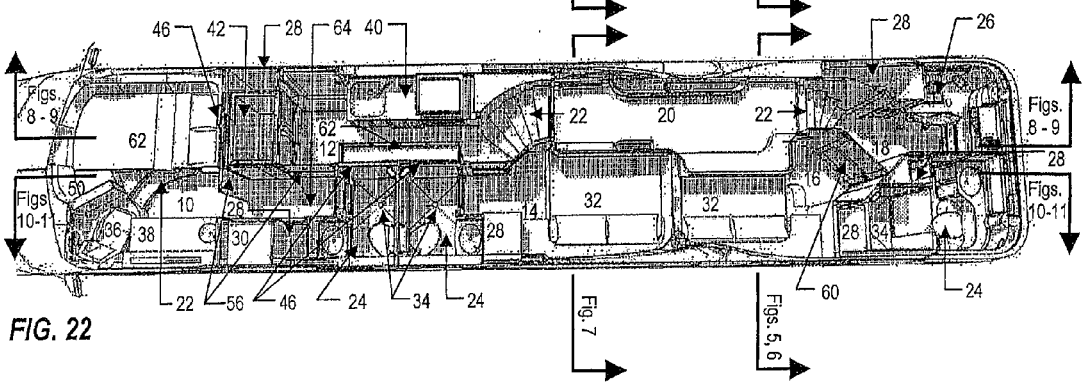

FIGS. 17-23 illustrate a multi-purpose main deck cabin that is well-suited for recreational vehicles including trailers and motor homes, boats or amphibious vehicles or vessels that are both a boat and recreational vehicle 25 feet or greater in length. The cabin includes a multipurpose salon or living/dining space 10 at the front of the amphibious yacht of the present disclosure that has a U-shaped couch 50. The couch area may include a removable multi-leaf table top 52 that may be stored under the seat cushions of the couch 50. The table may convert the couch area into a dining booth capable of serving 4 adults when the slide-out is retracted, as shown in FIGS. 21, and 8 adults when the slide-out is expanded to the maximum beam width, as shown in FIG. 18. The table top support stanchions may retract to a height that may allow the couch and table combination to convert to either a single bed 62 when the slide-out is retracted, as shown in FIGS. 22, or to 2 twin beds or a single king size bed 54 when the slide-out is expanded to the maximum beam width, as shown in FIG. 19. The forward multi-purpose salon 10 and sleeping space may be separated from the adjacent galley or kitchen space 12 by operable sliding and/or folding partition panels 58 and sliding pocket doors 56 that may retract into cavities in walls 46, as shown in FIGS. 19, 22. This may separate the forward salon 10 into a private suite or sleeping quarters with a private, enclosed corridor connection 64 to the forward most head or bathroom 24, closet 28, and washer/dryer closet 30 that has storage shelving above and below a single combination washer and dryer machine. In addition to the washer/dryer closet 30, there are a total of 6 closets 28 illustrated throughout the main deck level.

As shown in FIGS. 19 and 22, the forward cabin suite 10 with its king size bed or double twin bed embodiment, couch and table, private full bath, mini-bar 38 with sink and retracting television (56 in FIG. 10), laundry facilities 30, and full functioning helm 36 to pilot on land or water, provides a segregated space for crews' quarters that may lend well to commercial chartering. This multi-functional sleep space 10 may increase sleeping accommodations on the main deck to include three full-beam width (full vehicle width) staterooms or sleeping quarters 10, 14, 16 that each have directly adjoining private bathrooms with a toilet, sink 24 and dedicated shower area 34.

Figure 26:
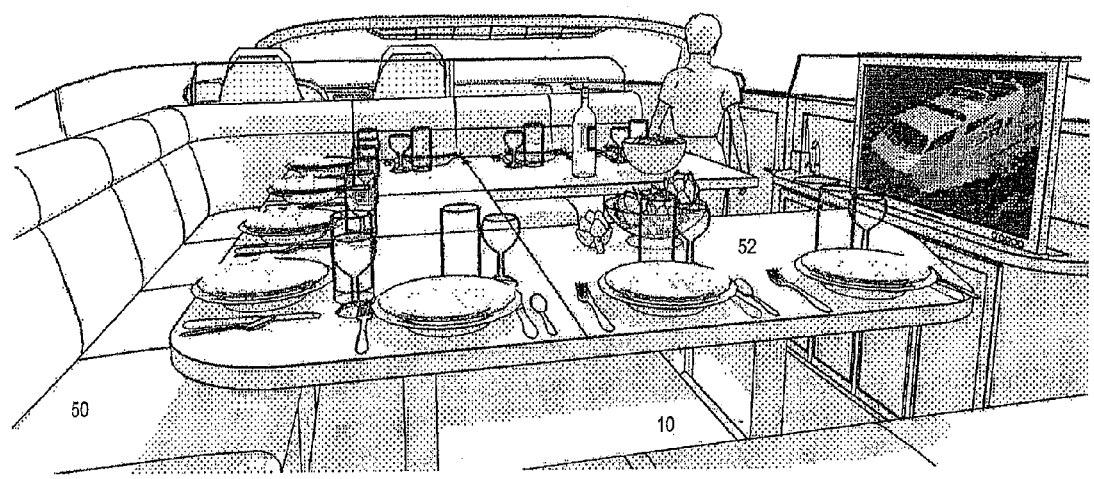
FIGS. 26 and 27 are Flybridge Dining and Sleeping Accommodations perspective views of the amphibious yacht of FIG. 1.
Figure 27:
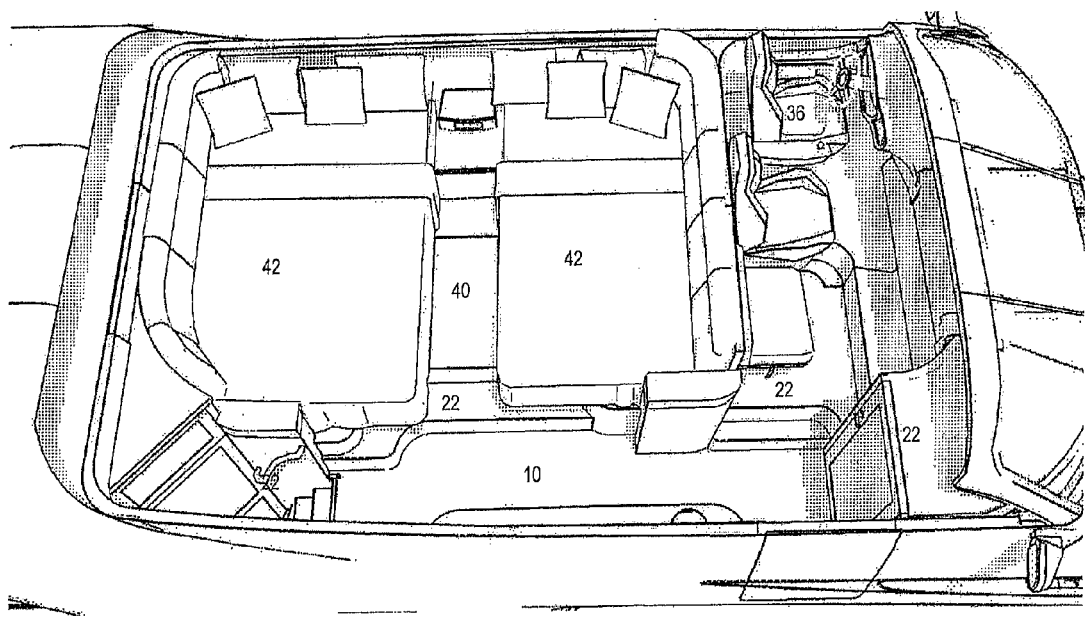

As shown in FIGS. 17-23, the aft (rear) stateroom may include a combination make-up table and office desk suitable for a computer 26. This stateroom may be converted into a multi-room suite as shown in FIG. 19, by closing operable hinged and/or sliding partition panels 58 that when open, store in a recessed area 46. As shown in FIGS. 26 and 27, the flybridge U-shaped couch easily converts to accommodate 2 additional beds (1 king size and 1 queen size) to bring the total sleeping capacity to 10 adult guests.

Embodiment 12

Two additional configurations that include off-road capability may include a Safari Wheeled Amphibious Vessel (SWAV) and a Military Amphibious Vessel (or Vehicle) (MWAV). These models may have larger off-road tires and feature 6×6×6, 8×8×8 and 10×10×10 wheel configurations, meaning that each of the 6, 8 or 10 wheels may be individually powered and include steering mechanisms that may be powered by electric motors. In off-road areas with boulders, pot holes and other irregular driving surfaces, individual wheels may retract or hyper-extend to compensate. The 8×8×8 MWAV is shown in FIG. 36 in water mode with headlights retracted, sponsons deployed and a remote gun turret mounted on the flybridge deck. In FIG. 37, the MWAV is shown in land mode with headlights and marker lights deployed, sponson retracted and a covered flybridge deck. The active suspension may be deployed in its off-road setting and provide 24 inch clearance from hull keels to road.

A series diesel electric hybrid driveline may include an electric in-wheel motor in every wheel that may provide between 60 and 140 horsepower. Typically, these motors may be about 100 horsepower each. This configuration may provide approximately 600 horsepower for the 6×6, 800 hp for the 8×8 and 1,000 hp for the 10×10 configuration. All wheels may be individually balanced by a variable traction control and active suspension height adjustment system, combined with having all-wheel steering to provide the MWAV with exceptional maneuverability and traction in snow or loose and water saturated soil. With between 600 and 1,000 hp available for land travel, the SWAV and MWAV models may have the ability to pull heavy loads, trailers or other towed equipment.

Embodiment 13

Figure 28A:
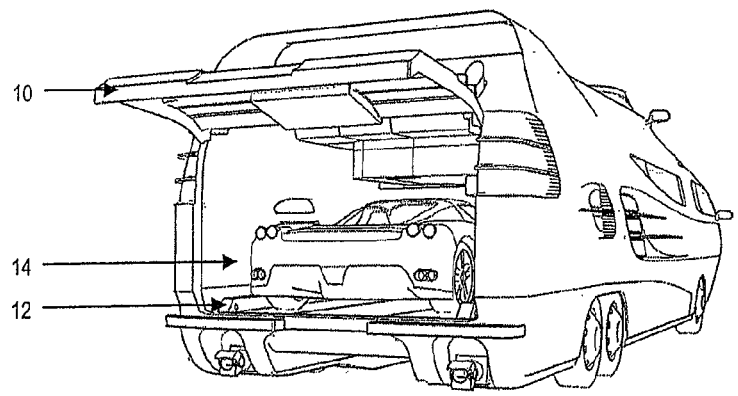
FIGS. 28A-30B are Cargo Carrying Embodiment perspective views of the amphibious yacht of FIG. 1.
Figure 29A:
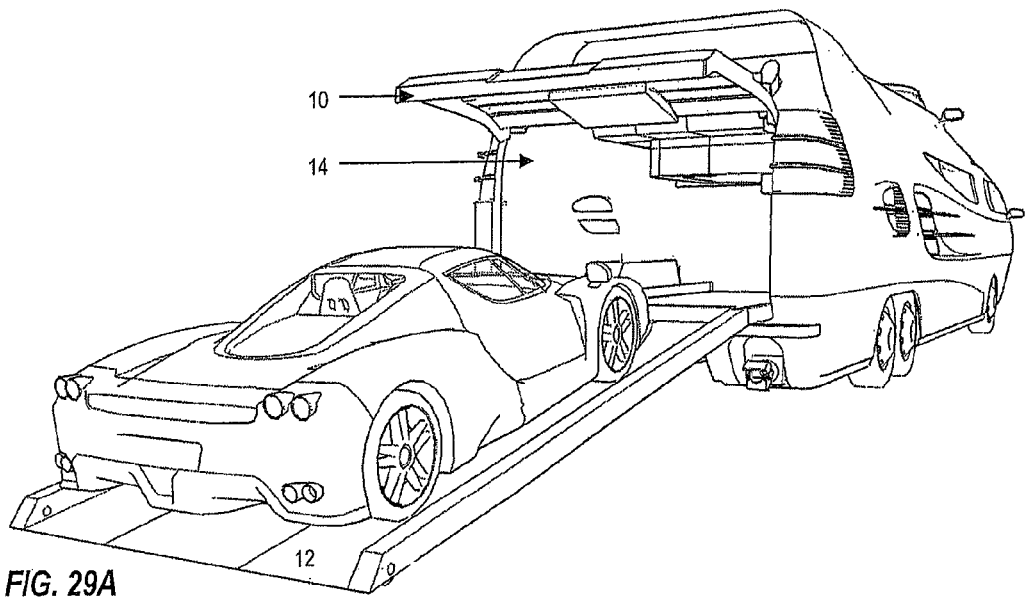
Figure 30A:
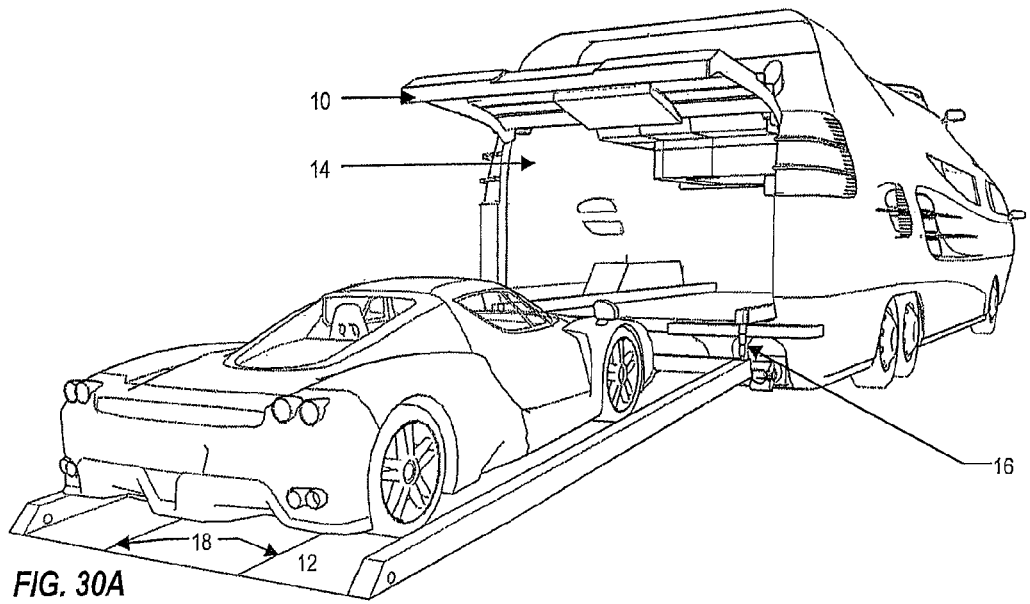

A large cargo door may allow large payloads to be stowed on board. FIGS. 28A, 29A 30A depict a gull-wing style rear cargo door 10 with a winch operated and/or hydraulic activated cargo elevator bed 12 that may accommodate an automobile. The cargo ramp may extend out horizontally from the onboard cargo bay or garage 14 and angle down to grade as shown in FIG. 29A. FIG. 30A shows that the ramp slope may be reduced to match the grade of the surface below the ramp by the action of two or more vertical hydraulic pistons 16 or by hyper-extending the cargo bed winch cables. This may allow vehicles with low ground clearance to drive safely off and on the ramp. When vehicles are not onboard, the ramp bed may be reduced about 36" in width to allow for the body of the cargo bay and the rest of the amphibious yacht of the present disclosure to retract in overall width, as described in Embodiment No. 7.

Figure 28B:
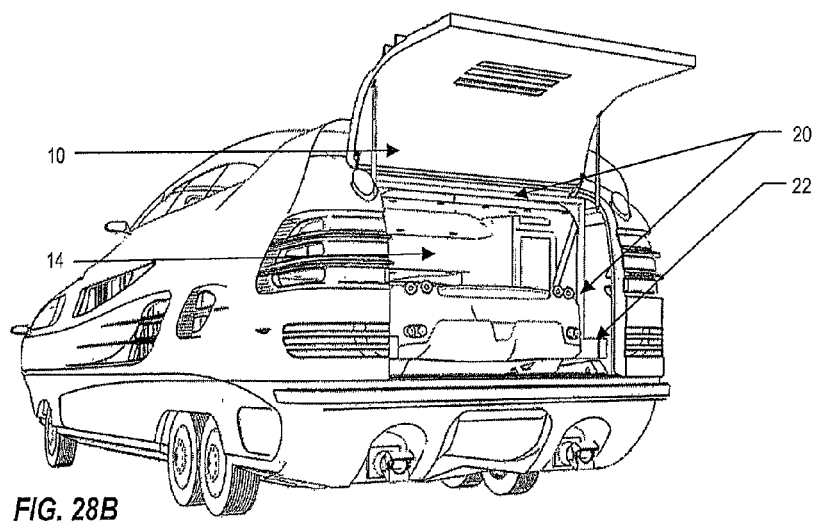
Figure 29B:
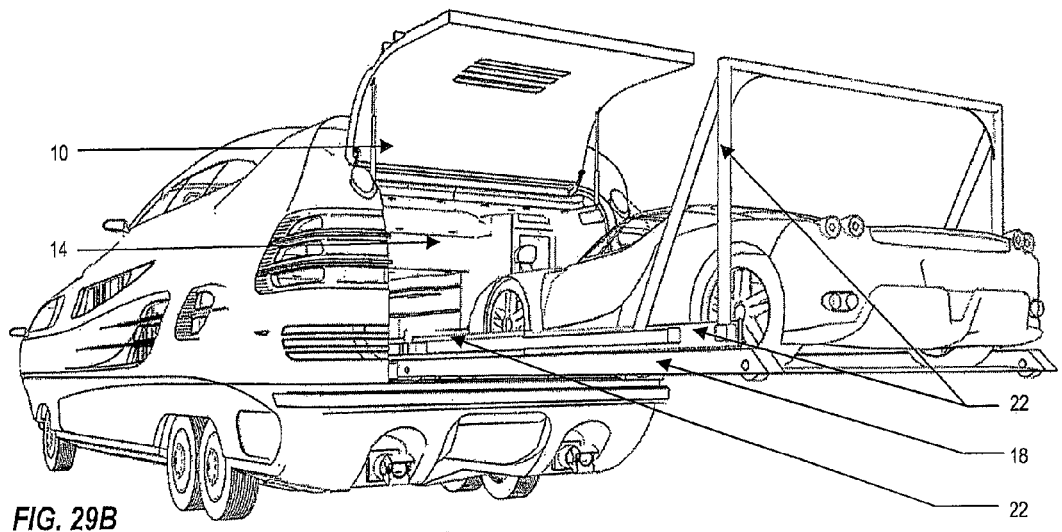
Figure 30B:
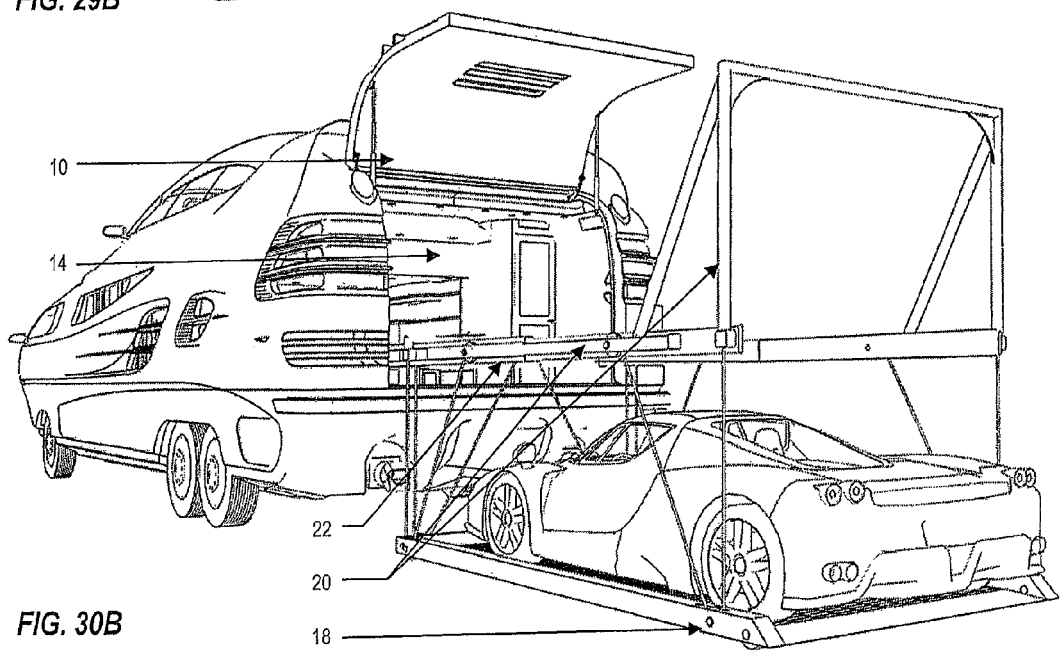

FIGS. 28B, 29B and 30B illustrate another lift-ramp design that may include a lift bed 18 suspended in a gantry frame 20 that may slide horizontally out through a gull-wing door 10 from the garage 14 or cargo bay on a telescoping tube steel frame 22. When the gantry is fully deployed on the telescoping frame, the lift bed may be lowered via a cable winch system to the ground and the payload can be off-loaded. This may allow one the ability to lower the lift bed far enough below the waterline to deploy watercraft and submersibles. Hypalon® floats attached to the bottom of both telescoping tube frames may be used as a weight balance stabilization feature to keep the bow of the vessel from rising when deploying heavy cargo on the water. The cylindrical-shaped floats may inflate and contact the water surface as the tube frames slide out and deflate as the frame retracts. Water ballast tanks may be concealed within the bow area that may be filled with water pumped in from below the hull while the lift bed is deployed to balance the vessel.

The large cargo door 10 in FIGS. 28-30 provides a means for reducing the difficulty that Mega Yachts or Super Yachts (herein referred to as mother ship) may encounter when loading and/or unloading automobiles. Typically, the mother ship may need to dock at a freight terminal and the vehicles need to be stowed on exposed decks, often high above the waterline where a large onboard davit or land based crane can pick and place the automobile. In this embodiment, the amphibious yacht of the present disclosure may enter from the water into a waterline-level, enclosed tender bay onboard the mother ship, making it possible for the vehicles to be stowed at or below the waterline where they may effectively lower the center of gravity and therefore aid in stabilizing the mother ship. Here, vehicles may not be subjected to corrosive weather conditions nor may they compromise the aesthetics of the mother ship, as they would if stowed on an exposed deck. In addition to being used to transport automobiles, the amphibious yacht of the present disclosure may serve as a yacht tender that may accept large payloads within a tender bay aboard the mother ship. The amphibious yacht of the present disclosure may enter the water from the mother ship's tender bay, ferry a vehicle, cargo and passengers across a bay, and deliver the payload to any destination on land via a boat ramp or, in the case of an automobile, onto any nearby roadway or into a garage. Cargo and vehicles may be delivered back to the mother ship in a similar roundtrip, completely out of view from returning passengers who may relax on the flybridge or forward salon and cabin spaces of the amphibious yacht of the present disclosure.

This may allow prized automobiles to be completely protected from the elements as they may be moved from an enclosed tender bay of the mother ship along with other cargo and passengers, to and from land within a completely enclosed environment. Passengers may enter and exit the automobile from within the cargo/garage bay of the amphibious vehicle. In rainy conditions, the amphibious yacht of the present disclosure may be driven to an enclosed garage on land where automobiles onboard may be delivered from the mother ship, dry and clean. For passengers who value their privacy, autos and passengers may be ferried in stealth to and from land, completely concealed from public view. The garage bay of the amphibious yacht of the present disclosure is also designed to be a recreational space for fishing, swimming or deploying kayaks, jet skis or similar small watercraft.

Embodiment 14

A distance detection and auto braking system may also be adapted to detect obstructions ahead of the amphibious yacht of the present disclosure that are less than a safe clear height or width for the amphibious yacht of the present disclosure to pass by. Upon detection of an obstruction with too low or too narrow a clearance, the system may automatically slow and stop the amphibious yacht of the present disclosure before a potential collision might occur. This system may be adapted to override the joy stick control for the water jet drives to reverse the thrust angle of the jet drives and stop the amphibious yacht of the present disclosure on water, when similar low height or width clearance obstructions or obstructions on the water in the travel path of the amphibious yacht of the present disclosure are detected.

A distance detection and automated slowing and stopping feature may be of great benefit to the auto pilot system used during water travel and for the cruise control system used on the road. This system may be an essential safety feature to avoid dangerous collisions for drive by wire functionality.

Figure 10:
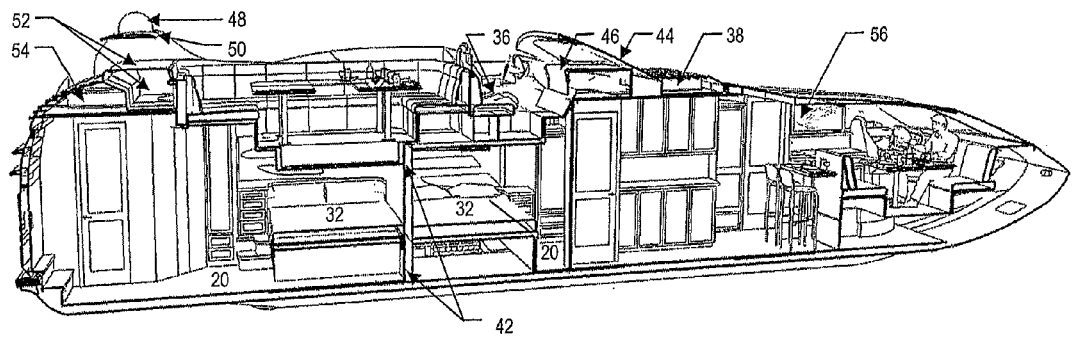
Figure 11:
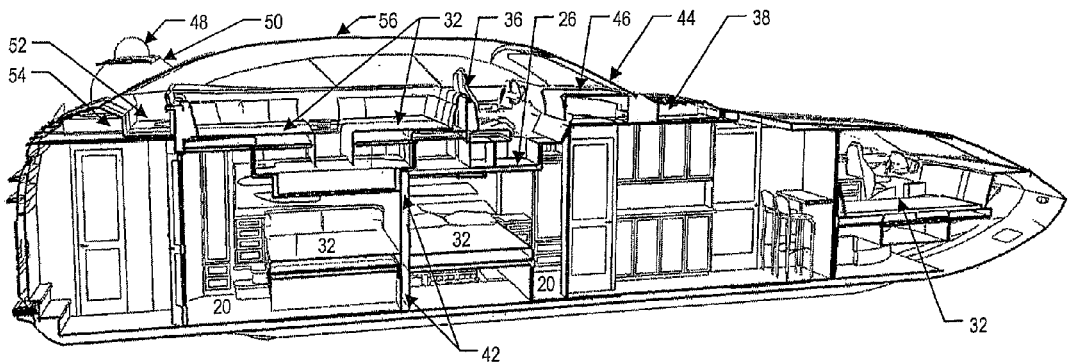

The overall height of the amphibious yacht of the present disclosure in FIGS. 10 and 11 is 13'-43" high, measured from the roadway to the top of the satellite domes 48 that mount toward the outside of the radar wing 50 and the radar unit that mounts at the center of the radar wing and the highest point of the convertible roof 56. The overall height of the amphibious yacht of the present disclosure may vary in quarter inch increments of measure up to 13'-6" or as low as 12'-3" to meet more restrictive height standards. The distance detection and auto braking system noted in Embodiment 14 may also be designed to detect obstructions ahead of the amphibious yacht of the present disclosure that are less than a safe height for the amphibious yacht of the present disclosure to clear and automatically slow to a stop before a potential collision might occur. Other features shown in FIGS. 10 and 11 are the Carrier Air V low profile air conditioning units 38, and 54 that may be concealed under removable louvers, the convertible roof boot 52, and the area where the convertible top stores when in the open position. Embodiment number 7, described above, provides a full vehicle width slide-out to reduce the overall maximum width of the amphibious yacht of the present disclosure when on land in order to meet width regulations and standards for travel on roadways. With the full vehicle slide-out deployed, the overall height and width may be less than the maximum allowable height and width requirements currently in place for traveling on U.S. roadways. Those restrictions are 13'-6" and 8'-6" respectively. Another feature (see Embodiment number 9 and FIGS. 13-15) for the amphibious yacht of the present disclosure may include a retractable swim platform that when retracted reduces the overall vehicle length to 44'-10". The overall length of the amphibious yacht of the present disclosure as shown in the FIGS. was derived from the median length of the most popular yacht size. According to National Marine Manufacturers Association statistics, 55,465 of the 75,690 motor yachts registered in the US in 2007 are between 40 and 50 feet in length. Presently the maximum length allowable on U.S. roadways for buses and recreational vehicles is 45 feet. In recent years, the maximum length for tractor trailer trucks increased to allow trailers up to 53 feet long. If the maximum allowable length regulations relative to the amphibious yacht of the present disclosure were to increase or decrease in the future, the amphibious yacht of the present disclosure may be adapted to a lengthened or shortened version to conform. It is contemplated that the amphibious yacht of the present disclosure may be adapted to have one less sleeping space than the configurations as described herein and may be between 32 and 40 feet in length to make maneuvering on tight urban roads easier. Ultimately, the amphibious yacht of the present disclosure is scalable proportionally for lengths shorter than the 25 foot medium size vessel described herein and larger than 45 feet.

To improve water/land mode transitions on inclined surfaces with a non-series hybrid driveline, one engine running at a low speed or RPM may drive a rear pair of wheels on the side of the amphibious yacht of the present disclosure where the engine is located, while the second independent engine, running at a different speed or RPM, may engaged to the water jet on the opposite side of the amphibious yacht of the present disclosure. As a result, during the transition from water to land or land to water, the amphibious yacht of the present disclosure may be driven by wheels and thrust by a water jet simultaneously. The water jet vector and speed control joystick may be manipulated by one of the pilot's hands while the pilot's other hand steers the front wheels with the steering wheel. A computer/electronic module between the joy stick and the water jet may compensate water jet deflectors to enable thrust vectoring to match the command of the joy stick when transitioning from running two water jet pumps to one or vice versa. Wheel acceleration and braking may be controlled by the pilot's foot. Water and land mode transitions may be further improved using a series diesel electric hybrid driveline as described herein.

When driving over the road, one driveline may be sufficient to power and provide wheel traction, allowing the second engine and transmission to be off-line. In the same situation, the series hybrid may only require one of the two generator sets to provide power over the road. If additional power is required for traversing steep hilled terrain, towing a heavy trailer, or compensating for slippery road conditions, the second engine and transmission (or second generator set and/or energy storage deices of the series hybrid) may be engaged, thus providing a combined estimated 1,000 to 1,200 horsepower and four wheel drive (series hybrid may be all-wheel drive with one or more generator sets supplying power).

In a still further embodiment, the amphibious yacht of the present disclosure may employ a single conventional gasoline or diesel internal combustion engine as a primary power source. It can be configured as an electric series hybrid where primary electrical power generation is created by a gasoline, diesel or other fuel source engine that is dedicated to driving an alternator to comprise a generator unit (genset) that is completely mechanically decoupled from both the water and land drivelines. The series hybrid configuration may then simplify the driveline as the alternator can be mounted directly to the engine flywheel (in some cases, to optimize alternator performance, a gear box could be added between the engine and alternator) eliminating the need for transmissions, transfer cases, differential gears, driveshafts and universal joints on land or water drivelines.

Mechanically decoupling the genset may also isolate the engine from the torque and shock forces that transmissions impose when changing speed, direction or shifting gears. A series hybrid offers maximum flexibility for where the primary power generator can be located in the vehicle and allows the assembly to be mounted on hydraulic and/or sprung vibration isolated mounts. This approach also allows the vehicle to be converted to alternate power sources such as fuel cells or other technologies that could be developed in the future. Being mechanically decoupled, the generator can run at a steady state RPM to optimize system efficiency if adequate energy storage devices are available to capture excess power output.

A series hybrid approach can accommodate propellers and/or water jets for marine propulsion. This is accomplished by coupling an electric propulsion motor to each water propulsion device including each propeller shaft in the case where the vehicle is outfitted with single or multiple propellers or single or multiple waterjets or a combination of props and jets. A transmission is not required in these configurations however some motors and applications could require reduction gearing.

Single or multiple electric traction motors may then be required to propel the wheels of a series hybrid land driveline. Traction motors can be mounted inside the hull with half-shafts that extend to wheels on either side of the vehicle with stuff boxes at the hull penetrations. One preferable solution is to have in-wheel electric motors in at least the front wheels and preferably in all wheels to provide all wheel drive and independent all-wheel traction control. In-wheel motors may then eliminate complication and potential water leaks that prior art shafts and stuff boxes create when penetrating the hull. Power and control cabling for in-wheel electric motors can be run through the center shaft of the suspension struts where a simple water-tight seal FIG. 38 118 located at the top of the strut tower 116 is significantly higher than the vehicle waterline, virtually eliminating the potential of water leakage.

The engine referenced in above may also be configured as both a series hybrid for the land mode driveline as described in and as a parallel hybrid for the water mode driveline. In a combination Series-Parallel Hybrid (SPH), the engine 102 in FIG. 38 can be mounted on the vehicle's longitudinal centerline as low in the hull 100 as is practicable. Unlike the series hybrid, a SPH configures the engine to serve multiple functions beyond simply powering an alternator. The engine will function in a series hybrid capacity to power an alternator capable of generating electricity to supply electric motors that provide motive power for the land driveline system as well as to charge energy storage devices such as battery arrays, ultra capacitors, etc.

An additional, advantageous feature of the engine in a SPH configuration will be its ability to power the water mode driveline conventionally and directly via a mechanical clutch assembly coupling which will allow the engine to function in a non-hybrid capacity. Engaging or disengaging the engine may be achieved with an engine-output clutch device 108 in FIG. 1 located at the connection point between the genset and propeller or waterjet drive shaft. The coupling can potentially be optimized with the addition of a marine transmission not shown in FIG. 38.

Figure 38:
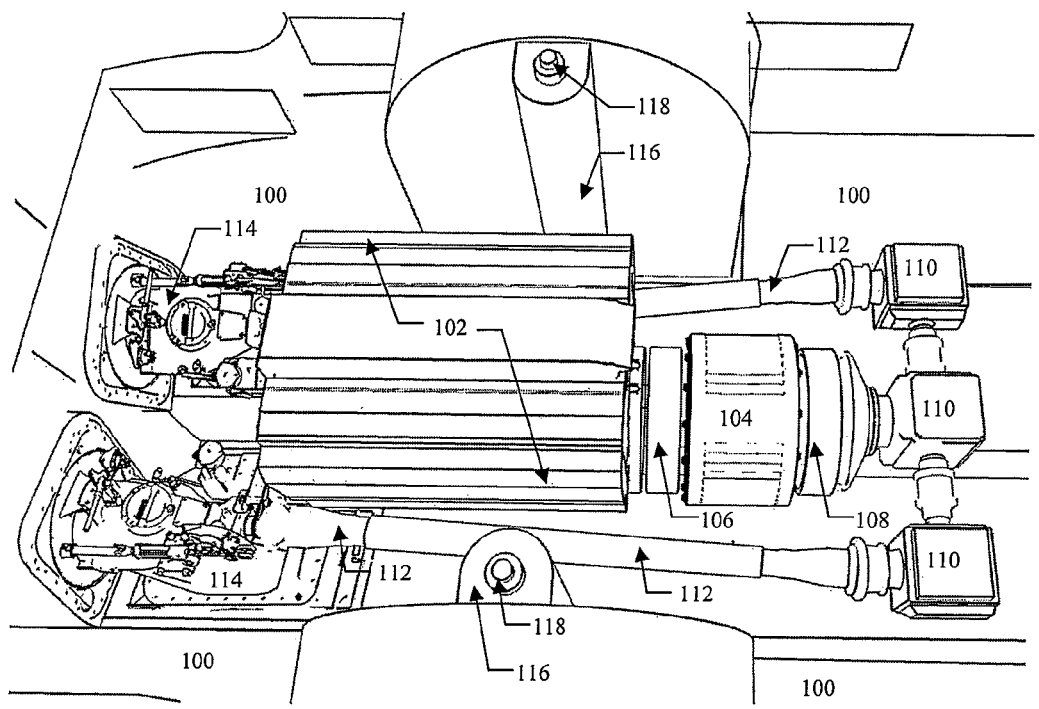
FIG. 38 is a Rear Cut-Away perspective view of the engine bay of a single engine iteration of the amphibious yacht.

The marine drive system can be further optimized by including a parallel hybrid option as shown in FIG. 38. The parallel option positions the alternator where it can serve in an additional role as an electric motor by being disengaged from the engine and supplied with electricity stored or generated by sources other than the engine. The alternator/motor 104 as show in FIG. 38 can be attached to the engine flywheel via an engine-alternator clutch assembly 106. The clutch will disengage the alternator/motor from the engine and driveline when the engine drives the water driveline in non-hybrid mode or if electrical power generation is not needed when the engine is running.

The SPH configuration has the alternator/motor 104 mounted to the engine-alternator clutch assembly 106 that attaches directly to the engine flywheel. Alternator/motors are commercially available that can allow a drive shaft driven solely by the engine to freely pass through the center of the rotor shaft. The clutch assembly and alternator/motor pass-through shaft are required in order for the engine to serve as the sole source of water mode power.

Applying appropriate levels of electrical power to the alternator/motor from energy storage devices and engaging the engine-alternator clutch 106 while the engine is powering the marine driveline transforms the marine driveline to a parallel hybrid. This combination brings together the potential power output of the engine with the power of the electric motor which improves acceleration to overcome the high drag hump associated with achieving plane on water and to increase top water speed for short time intervals.

Another option is to run the water driveline in all electric mode by disengaging the motor/alternator from the engine via the engine-alternator clutch 106 and engaging the engine-output clutch 108 between the alternator/motor and water mode driveshaft, then powering the alternator/motor with electricity from energy storage devices.

If the alternator cannot accommodate a pass-through driveshaft, a specialized transmission may be required. This alternate transmission will be equipped with an inline marine drive power take-off (PTO) to engage the marine driveshaft. A second PTO will accept the alternator/motor in an offset mounting position which is parallel or perpendicular to the driveline orientation.

If the alternator cannot accommodate a pass-thru drive shaft and a transmission is not an option the alternator can be mounted with a clutch assembly to what is typically considered the front of the engine where harmonic balancers and/or pulleys for accessories are typically mounted. All accessories typically located at this end of the engine that are driven off pulleys or the engine crank or cams can be electrified and located remotely. Locating the alternator/motor at the front of the engine will not allow the water driveline to function in all electric mode.

FIG. 38 illustrates a water mode configuration that can power multiple propellers or waterjets via a commercially available splitter gear assembly 110 that connects to the output side of the engine-output clutch 108 and uses differential or ring and pinion gears to provide RPM matched outputs for multiple water mode propulsion units. In FIG. 38 the splitter gear assembly uses driveshafts to connect to commercially available waterjets 114.

A unique, compact, non-linear arrangement of the driveline is shown in FIG. 38. This driveline reduces the space claim or total plan footprint of the genset and splitter gear assemblies for applications with twin propellers, or in this case twin waterjets 114 shown in FIG. 38 by rotating the genset 180 degrees and mounting it in the space between the water jets or propellers.

The SPH configuration eliminates the need for electric motors to drive the water mode driveline in a series parallel configuration.

An additional advantage of a series or SPH driveline is that the output power and RPM speed of the alternator/motor powered by energy storage devices will far exceed the electric engine starter motor output that engine manufacturers specify. This allows the conventional starter motor to be eliminated.

While particular embodiments of the present disclosure have been illustrated and described, it would be obvious to those skilled in the art that various other changes and modifications can be made without departing from the spirit and scope of the disclosure. It is therefore intended to cover in the appended claims all such changes and modifications that are within the scope of this disclosure.

What is claimed is:

1. An amphibious yacht having a forward most deck including a leading edge on said forward most deck, said yacht for use in a first configuration on water and in a second configuration on land, the yacht having a bow and stern comprising two asymmetric monohedron hulls separated by a continuous hull tunnel including a tunnel bow curve, said curve starting at the leading edge of the forward most deck which curve increases in radius as it proceeds into the hull tunnel wherein each of said monohedron hulls have a constant deadrise from an apex of the monohedron hull bow curve to rear wheel wells, wherein said tunnel has a height and is defined by vertical walls and said height is equal to or greater than 5 inches, wherein one or more continuous orthogonal hard chine offsets run longitudinally down the vertical walls of the tunnel.

2. The amphibious yacht of claim 1 wherein said constant deadrise angle is 12 to 20 degrees.

3. The amphibious yacht of claim 2 wherein the constant deadrise angle is 15½ degrees.

4. The amphibious yacht of claim 1 wherein said tunnel has a height and is defined by walls and said height is 6 inches to 42 inches.

5. The amphibious yacht of claim 1 wherein said offsets project between 1.5 to 6.0 inches from the walls of the hull tunnel.

6. The amphibious yacht of claim 1 wherein the height of the yacht is no greater than 13 feet 6 inches, the length is no greater than 45 feet and the width is no greater than 12 feet 6 inches.

7. The amphibious yacht of claim 1 including a bridging deck including a second level.

8. The amphibious yacht of claim 1 including a pair of rigid-hulled inflatable sponsons that extend and retract from said sides.

9. The amphibious yacht of claim 1 wherein the yacht is configured to plane on water.

10. The amphibious yacht of claim 1 having two sides and one or more suspension systems, wherein in the second configuration, the one or more suspension systems each include a front wheel and a pair of rear wheels on each side of the yacht, the rear wheels located one in front of the other.

11. The amphibious yacht of claim 10 wherein said rear wheels include retractable independent suspension systems.

12. The amphibious yacht of claim 1 further including a flybridge helm including a convertible top and retracting windshield.

13. The amphibious yacht of claim 10 wherein said one or more suspension systems are independent from one side of the yacht to the other.

14. The amphibious yacht of claim 1 further including an extendable retractable swim platform.

15. An amphibious yacht having a forward most deck including a leading edge on said forward most deck, said yacht for use in a first configuration on water and in a second configuration on land, the yacht having a bow and stern comprising two asymmetric monohedron hulls separated by a continuous hull tunnel including a tunnel bow curve, said curve starting at the leading edge of the forward most deck which curve increases in radius as it proceeds into the hull tunnel wherein each of said monohedron hulls have a constant deadrise from an apex of the monohedron hull bow curve to rear wheel wells, wherein said yacht has a longitudinal center of gravity, further including a single engine, wherein said engine is connected to a left hand or right hand driveline and powers a water jet propulsion system in said first configuration and one or more drive wheels in said second configuration.

16. The amphibious yacht of claim 15 wherein said constant deadrise angle is 12 to 20 degrees.

17. The amphibious yacht of claim 15 wherein the constant deadrise angle is 15½ degrees.

18. The amphibious yacht of claim 15 wherein said tunnel has a height and is defined by walls and said height is between 12 inches to 42 inches.

19. The amphibious yacht of claim 15 wherein said tunnel has a height and is defined by vertical walls and one or more continuous orthogonal hard chine offsets run longitudinally down the vertical walls of the tunnel, said offsets project between 1.5 to 6.0 inches from the walls of the hull tunnel.

20. The amphibious yacht of claim 15 wherein the height of the yacht is no greater than 13 feet 6 inches, the length is no greater than 45 feet and the width is no greater than 12 feet 6 inches.

21. The amphibious yacht of claim 15 including a bridging deck including a second level.

22. The amphibious yacht of claim 15 wherein the yacht is configured to plane on water.

23. The amphibious yacht of claim 15 having two sides and one or more suspension systems, wherein in the second configuration, the one or more suspension systems each include a front wheel and a pair of rear wheels on each side of the yacht, the rear wheels located one in front of the other.

24. The amphibious yacht of claim 23 wherein said rear wheels include retractable independent suspension systems.

25. The amphibious yacht of claim 23 wherein said one or more suspension systems are independent from one side of the yacht to the other.

26. The amphibious yacht of claim 15 further including a flybridge helm including a convertible top and retracting windshield.

27. The amphibious yacht of claim 15 further including an extendable retractable swim platform.

28. The amphibious yacht of claim 15 wherein said water jet propulsion systems include a pair of joy-stick controlled water jets.

29. The amphibious yacht of claim 15 wherein said engine is a series electric hybrid driveline that drives in-wheel electric motors.

30. The amphibious yacht of claim 15 wherein said engine is a series-parallel hybrid wherein said engine functions is a series hybrid mode to power an alternator configured to generate electricity to drive said drive wheels and said engine functions in parallel hybrid mode to power said water jet propulsion system.

* * * * *